US012688043B2

(12) United States Patent
Beu et al.

(10) Patent No.:    US 12,688,043 B2
(45) Date of Patent:        Jul. 21, 2026

(54) MATRIX MULTIPLICATION IN A DYNAMICALLY SPATIALLY AND DYNAMICALLY TEMPORALLY DIVIDABLE ARCHITECTURE

(71) Applicant: Arm Limited, Cambridge (GB)

(72) Inventors: Jesse Garrett Beu, Duluth, GA (US); Thomas Christopher Grocutt, Cambridge (GB)

(73) Assignee: Arm Limited, Cambridge (GB)

( * ) Notice:    Subject to any disclaimer, the term of this patent is extended or adjusted under 35 U.S.C. 154(b) by 423 days.

(21) Appl. No.: 18/125,416

(22) Filed:    Mar. 23, 2023

(65)                 Prior Publication Data

US 2024/0320005 A1      Sep. 26, 2024

(51) Int. Cl.
    *G06F 9/30*              (2018.01)
(52) U.S. Cl.
    CPC ........ *G06F 9/30145* (2013.01); *G06F 9/3001* (2013.01); *G06F 9/30036* (2013.01); *G06F 9/30098* (2013.01)

(58) Field of Classification Search
    None
    See application file for complete search history.

(56)                 References Cited

U.S. PATENT DOCUMENTS 7,376,812 B1 * 5/2008 Sanghavi ............ G06F 9/30021
                                                                                712/E9.046
8,555,034 B2 * 10/2013 Damron .............. G06F 9/30032
                                                                                712/210

| | | | |
|---|---|---|---|
| 10,599,428 B2 | 3/2020 | Grocutt | |
| 11,379,556 B2 | 7/2022 | Mattina et al. | |
| 12,175,246 B2 * | 12/2024 | Baum ................... | G06F 9/3013 |
| 2014/0195783 A1 | 7/2014 | Karthikeyan et al. | |
| 2018/0189239 A1 | 7/2018 | Nurvitadhi et al. | |
| 2019/0042242 A1 | 2/2019 | Das et al. | |

(Continued)

FOREIGN PATENT DOCUMENTS

| | | | | |
|---|---|---|---|---|
| EP | 3602277 | 2/2020 | | |
| GB | 2409059 A * | 6/2005 | ......... | G06F 9/30032 |

(Continued)

OTHER PUBLICATIONS

Machine Translation of Chinese Patent Application CN 107851015 A, 2018. (Year: 2018).*

(Continued)

*Primary Examiner* — Steven G Snyder
(74) *Attorney, Agent, or Firm* — NIXON & VANDERHYE P.C.

(57)                 ABSTRACT

A data processing apparatus includes first vector registers and second vector registers, both dynamically spatially and dynamically temporally dividable. Decode circuitry receives one or more matrix multiplication instructions that indicate a set of first elements in the first vector registers and a set of second elements in the second vector registers, and in response to receiving the matrix multiplication instructions they generate a matrix multiplication operation. The matrix multiplication operation causes one or more execution units to perform a matrix multiplication of the set of first elements by the set of second elements and an average bit width of the first elements is different to an average bit width of the second elements.

22 Claims, 23 Drawing Sheets

(56)                    References Cited

U.S. PATENT DOCUMENTS

| | | | | |
|---|---|---|---|---|
| 2019/0121837 A1* | 4/2019 | Azizi | .................... | G06N 3/082 |
| 2020/0050918 A1* | 2/2020 | Chen | ........................ | G06N 3/04 |
| 2020/0210517 A1* | 7/2020 | Baum | .................. | G06F 9/3802 |
| 2020/0310793 A1 | 10/2020 | Rubanovich et al. | | |
| 2020/0349216 A1* | 11/2020 | Das Sarma | ......... | G06F 9/30032 |
| 2021/0089925 A1* | 3/2021 | Partovi Nia | ........... | G06N 3/048 |
| 2021/0210840 A1* | 7/2021 | Xu | ........................ | H01Q 21/26 |
| 2021/0389948 A1 | 12/2021 | Beu et al. | | |
| 2022/0365783 A1* | 11/2022 | Shin | .................... | G06F 9/30036 |
| 2022/0366008 A1* | 11/2022 | Shin | ........................ | G06F 9/541 |
| 2024/0320292 A1* | 9/2024 | Beu | ........................ | G06F 17/16 |

FOREIGN PATENT DOCUMENTS

| | | | | | |
|---|---|---|---|---|---|
| GB | 2409066 | A | * | 6/2005 | ......... G06F 9/30032 |
| GB | 2548601 | | | 2/2019 | |
| WO | WO-2005026974 | A1 | * | 3/2005 | ............ G06F 15/00 |
| WO | 2018/174925 | | | 9/2018 | |
| WO | WO-2021041447 | A1 | * | 3/2021 | ............ G06F 5/012 |
| WO | WO-2024063874 | A1 | * | 3/2024 | ............ G06F 17/16 |

OTHER PUBLICATIONS

Machine Translation of Chinese Patent Application CN 113094096 A, 2021. (Year: 2021).*

Machine Translation of Japanese Patent Application JP 4426099 B2, 2010. (Year: 2010).*

'Grokking RISC-V Vector Processing' by Erik Engheim, Jan. 5, 2023. (Year: 2023).*

'Regularization of Neural Networks using DropConnect' by Wan et al., 2013. (Year: 2013).*

'A Mixed-Precision RISC-V Processor for Extreme-Edge DNN Inference' by Ottavi et al., 2020. (Year: 2020).*

"Risc-V "V" Vector—Extension Version 1.0" May 2, 2023. (Year: 2023).*

'Vitruvius+: An Area-Efficient RISC-V Decoupled Vector Coprocessor for High Performance Computing Applications' by Minervini et al., 2023. (Year: 2023).*

'CK-12 Algebra II with Trigonometry' by Jordan and Dirga, Feb. 28, 2015. (Year: 2015).*

International Search Report and Written Opinion of the International Searching Authority for PCT/GB2024/050262 mailed Jun. 21, 2024, 24 pages.

International Search Report and Written Opinion of the International Searching Authority for PCT/GB2024/050277 mailed Jul. 2, 2024, 24 pages.

U.S. Appl. No. 18/125,432, filed Mar. 23, 2023, Beu et al.

Partial International Search Report for PCT/GB2024/050262 mailed Apr. 30, 2024, 19 pages.

Partial International Search Report for PCT/GB2024/050277 mailed May 8, 2024, 19 pages.

* cited by examiner

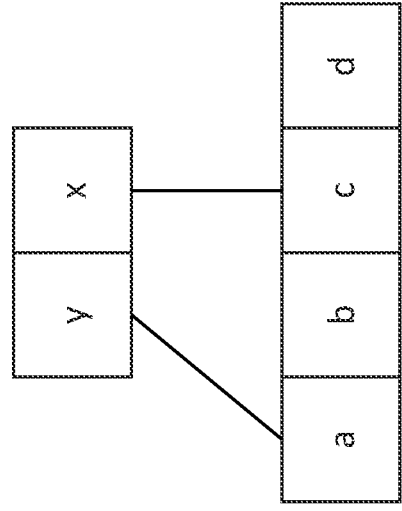
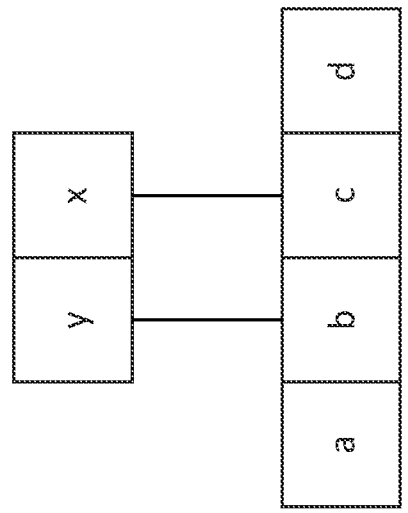
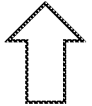
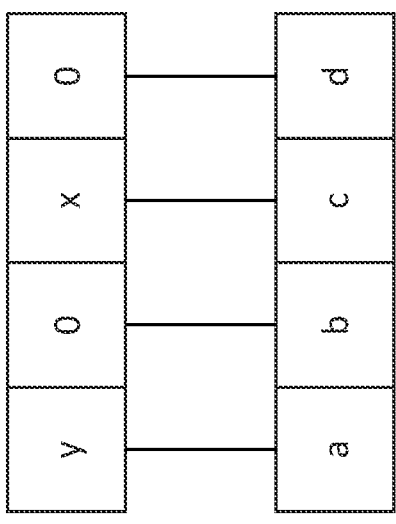
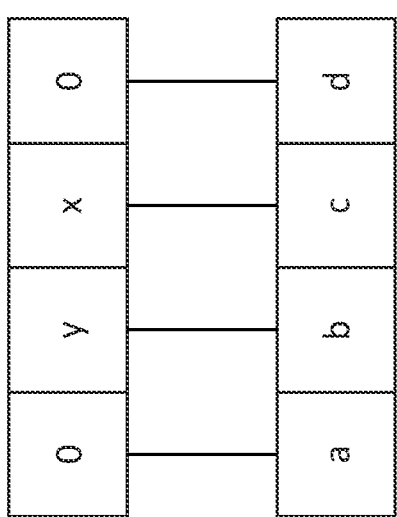
FIG. 10

| Loads | Ops |
|---|---|
| VLDR Q9, & Cmpr_Data | |
| VLDR Q0, &A00 | VMLA8_4 R0, R1, Q0, Q4, Q9, #0 |
| VLDR Q4, &B00 | |
| VLDR Q1, &A10 | VMLA8_4 R2, R3, Q0, Q5, Q9, #1 |
| VLDR Q5, &B01 | VMLA8_4 R4, R5, Q1, Q4, Q9, #0 |
| VLDR Q2, &A01 | VMLA8_4 R6, R7, Q1, Q5, Q9, #1 |
| VLDR Q6, &B10 | VMLA8_4 R0, R1, Q2, Q6, Q9, #2 |
| VLDR Q3, &A11 | VMLA8_4 R2, R3, Q2, Q7, Q9, #3 |
| VLDR Q7, &B11 | VMLA8_4 R4, R5, Q3, Q6, Q9, #2 |
| | VMLA8_4 R6, R7, Q3, Q7, Q9, #3 |

Reordering of encoding information to reduce register pressure (4 channel interleave)

Reorder to accommodate respecting beat boundary

Shading represents data needed for different iterations.

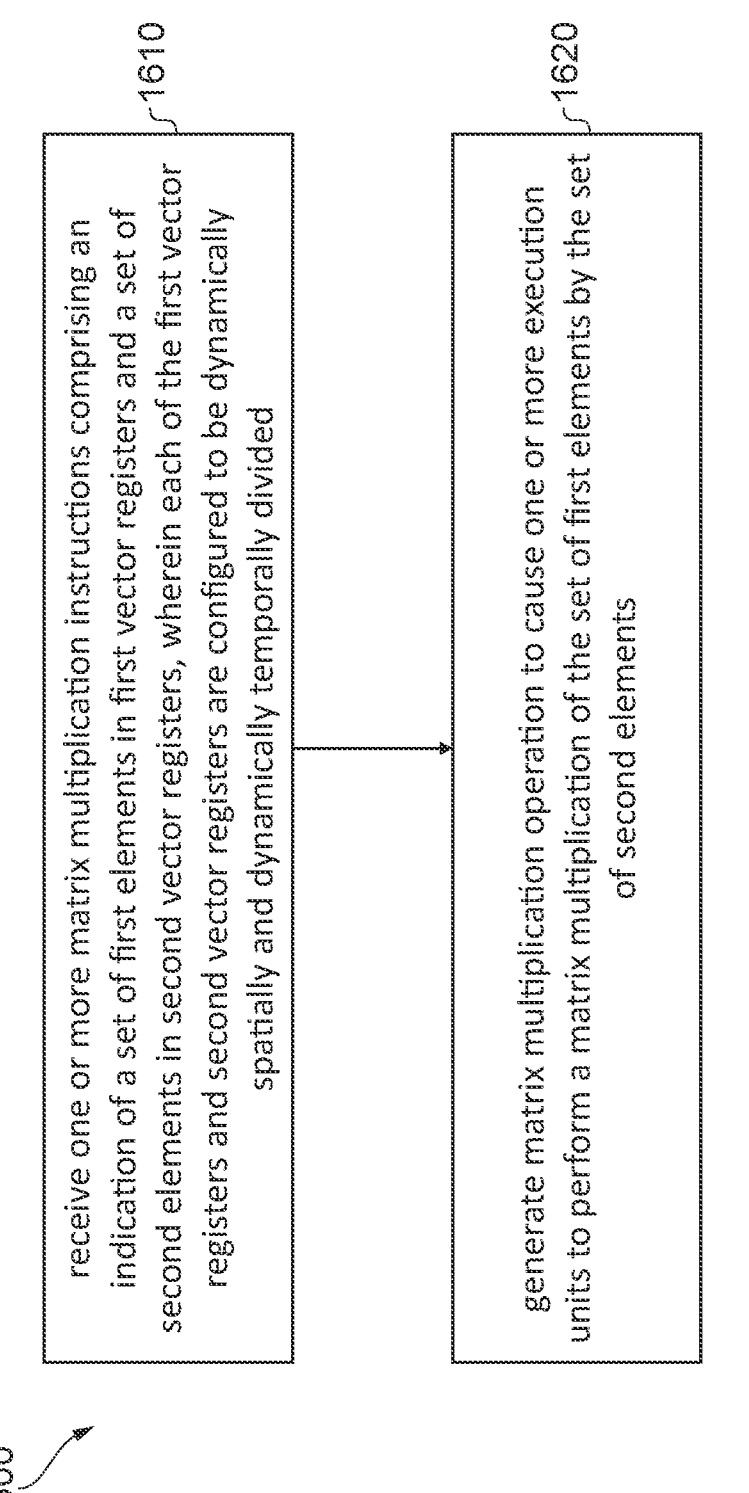

receive one or more matrix multiplication instructions comprising an indication of a set of first elements in first vector registers and a set of second elements in second vector registers, wherein each of the first vector registers and second vector registers are configured to be dynamically spatially and dynamically temporally divided

1610 generate matrix multiplication operation to cause one or more execution units to perform a matrix multiplication of the set of first elements by the set of second elements

1710 receive a model comprising a plurality of weights in a first format

1720 performing a modification of the model from the first format to a second format

1730 outputting the model comprising the plurality of weights in a second format

1700

MATRIX MULTIPLICATION IN A DYNAMICALLY SPATIALLY AND DYNAMICALLY TEMPORALLY DIVIDABLE ARCHITECTURE

TECHNICAL FIELD

The present disclosure relates to data processing.

DESCRIPTION

It is desirable to increase the efficiency with which matrix multiplications can take place.

SUMMARY

Viewed from a first example configuration, there is provided a data processing apparatus comprising: first vector registers and second vector registers, both configured to be dynamically spatially and dynamically temporally divided; and decode circuitry configured to receive one or more matrix multiplication instructions comprising an indication of a set of first elements in the first vector registers and a set of second elements in the second vector registers, and in response to receiving the matrix multiplication instructions to generate a matrix multiplication operation, wherein the matrix multiplication operation is configured to cause one or more execution units to perform a matrix multiplication of the set of first elements by the set of second elements; and an average bit width of the first elements is different to an average bit width of the second elements.

Viewed from a second example configuration, there is provided a data processing method comprising: receiving one or more matrix multiplication instructions comprising an indication of a set of first elements in first vector registers and a set of second elements in second vector registers, wherein each of the first vector registers and second vector registers are configured to be dynamically spatially and dynamically temporally divided; in response to receiving the matrix multiplication instructions, generating a matrix multiplication operation, wherein the matrix multiplication operation causes one or more execution units to perform a matrix multiplication of the set of first elements by the set of second elements; and an average bit width of the first elements is different to an average bit width of the second elements.

Viewed from a third example configuration, there is provided a computer program for controlling a host data processing apparatus to provide an instruction execution environment comprising: first data structures and second data structures, both configured to be dynamically spatially and dynamically temporally divided; and decode logic configured to receive one or more matrix multiplication instructions comprising an indication of a set of first elements in the first data structures and a set of second elements in the second data structures, and in response to receiving the matrix multiplication instructions to generate a matrix multiplication operation, wherein the matrix multiplication operation is configured to cause execution logic to perform a matrix multiplication of the set of first elements by the set of second elements; and an average bit width of the first elements is different to an average bit width of the second elements.

BRIEF DESCRIPTION OF THE DRAWINGS

The present invention will be described further, by way of example only, with reference to embodiments thereof as illustrated in the accompanying drawings, in which:

FIG. 10 shows an example in which a set of weights are multiplied by a set of activations;

FIG. 15 shows a flowchart that illustrates an example of the present technique;

DESCRIPTION OF EXAMPLE EMBODIMENTS

Figure 1:
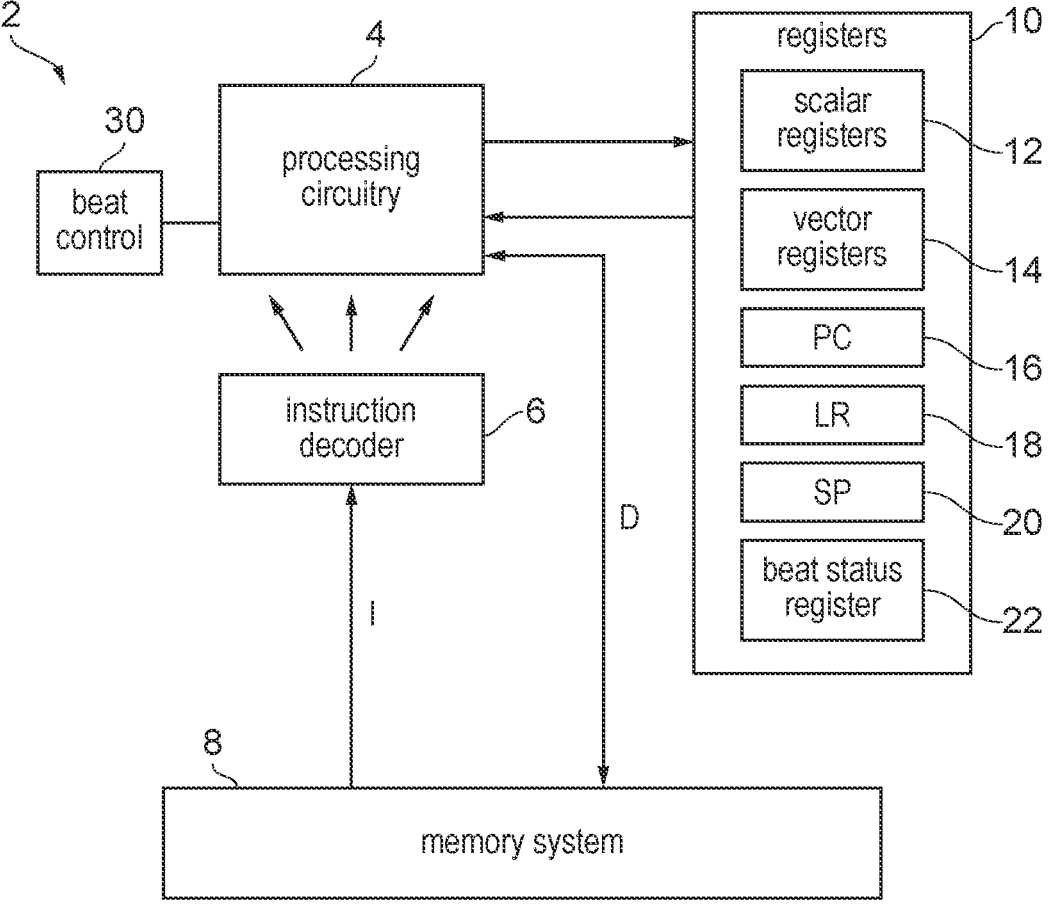
FIG. 1 schematically illustrates an example of a data processing apparatus.

A neural network may be made up from a number of layers in which a set of inputs are passed to 'neurons' (of which there may be several per layer) and the output of neurons in one layer being passed as inputs to neurons in a next layer. Each neuron receives a number of inputs (activations), each of which is then multiplied by (potentially different) scaling factors (weights) and the results added together to produce an output. The whole of these neuron weights and connections make up a model and are often recorded as a matrix. The process of training a neural network involves adjusting the weights at each neuron so that the final output value produced by a final layer can be used as a measurement (e.g. as to whether the inputs represent data of a particular category). The process of training or using a neural network therefore involves numerous operations in which one vector is multiplied by another vector and the results are added together (e.g. in a dot-product multiply accumulate operation). When there is reuse among which vectors are being multiplied against each other, there is opportunity to use matrix multiply accumulate operations.

Before discussing the embodiments with reference to the accompanying figures, the following description of embodiments is provided.

In some examples, there is provided a data processing apparatus comprising: first vector registers and second vector registers, both configured to be dynamically spatially and dynamically temporally divided; and decode circuitry configured to receive one or more matrix multiplication instructions comprising an indication of a set of first elements in the first vector registers and a set of second elements in the second vector registers, and in response to receiving the matrix multiplication instructions to generate a matrix multiplication operation, wherein the matrix multiplication operation is configured to cause one or more execution units to perform a matrix multiplication of the set of first elements by the set of second elements; and an average bit width of the first elements is different to an average bit width of the second elements.

It will be appreciated that representing the sets of weights and the sets of activations can result in extremely large data structures. For instance, in a neural network comprising tens to hundreds of layers, with tens of thousands of neurons, each of which uses tens or hundreds of activations, the overall data structure could involve millions or billions of activations. If each activation is represented by an 8-bit number, this can result in a very large dynamic data structure (to store the activations) to represent a single input. One option is to reduce the size (bit width) of the weights or the activations, e.g. so that each weight and/or activation takes up only four bits. In practice, this can work. However, the inventors of the present technique have determined that reducing the bit width of both the weights and the activations results in particularly poor performance whereas reducing only the average bit width of the weights can result in only a small drop in performance for a large reduction in model data structure size (to store the weights). A further advantage to reducing the size (average bit width) of the weights is that in certain architectures, it is possible to improve the throughput of the calculations. This is because a larger number of weights can be input at once (since each one occupies a smaller number of bits). The present technique achieves this by performing a matrix multiplication between the activations and the weights-meaning that at least one of the elements being multiplied is two dimensional rather than both elements being one dimensional vectors. Note that here we refer to an average bit width. That is the number of bits used to refer to all of the weights (e.g. in one of the vector registers) divided by the number of weights represented by that data (which might include implicit values). Of course, the present technique is not limited to multiplications between activations and weights and is applicable to other matrix multiplications as well. The present technique is particularly well adapted to beat-based architectures in which the vector registers can be dynamically divided in space and/or time so that the size of the elements taken from the vector registers can be dynamically controlled and the rate at which 'pipelining' of vector instructions occurs can be dynamically controlled. The use of the beat based architecture in combination with a matrix multiplication enables an increased number of weight-activation multiplications to be achieved without repeated loading/unloading of values. The registers being spatially divided encompasses the ability for a particular processor micro-architecture implementation to change the logical division of bits so as to represent distinct values of different sizes depending on the values, with the ability to vary this either statically based on boot-time configuration or dynamically at runtime. The registers being temporally divided encompasses the ability for a particular processor micro-architecture implementation to support different size beats (variable number of bits of the vector processed per cycle), with the ability to vary this either statically based on boot-time configuration or dynamically at runtime.

In some examples, the first elements comprise a single row of n activations and the second elements comprise a pair of columns, each comprising n weights; and the matrix multiplication instructions comprise an indication of a result register configured to store a first set of bits of a result of the matrix multiplication and a second set of bits of the result of the matrix multiplication. The two columns of weights can each represent a separate set of weights—e.g. each relating to different filters. These two columns of weights (the filters) are then multiplied against the same set of input activations to produce two new output activation channels (the first set and the second set of bits of the result of the matrix multiplication). In this way two filters can be processed simultaneously, doubling the throughput. It will be appreciated that in practice, the pair of columns might be represented sequentially as the transpose of columns of a (weight) matrix.

In some examples, the matrix multiplication instructions comprise an indication of a further result register; the result register is configured to store the first set of bits of the result of the matrix multiplication; and the further result register is configured to store the second set of bits of the result of the matrix multiplication. In these examples, one of the result registers relates to the output feature (activation channel) of one filter (e.g. column 0's filter) and the other output register relates to the output feature (activation channel) of the second filter (column 1's filter).

In some examples, the matrix multiplication multiplies fewer rows of the first set of elements than a number of columns of the second set of elements. Of course, it will be appreciated that the use of the terms 'columns' and 'rows' here refers to the logical nature of the matrix multiplication being performed and not necessarily how the data elements are stored in hardware or represented in an instruction (which could be transposed).

In some examples, the matrix multiplication is of one row of the first set of elements and two columns of the second set of elements. Again, the use of terms 'row' and 'column' refers to the logical nature of the matrix multiplication being performed rather than how the data is actually stored or represented in an instruction.

In some examples, the matrix multiplication instructions comprise an uncompressed matrix multiplication instruction; the first elements comprise a single group of n activations; the second elements comprise m groups of n weights, where m>1; and a bit width of the second elements is 1/m times a bit width of the first elements. An uncompressed matrix multiplication instruction is one in which each element of the matrix is present in the representation (model or data structure) as opposed to being removed. For instance, some forms of matrix compression might eliminate the value '0' and provide information for the removed zeros to be reinserted at processing time. In these uncompressed matrix multiplication instructions, a single group of activations is multiplied against multiple (m) groups of weights, each of which relates to a different feature or channel. Since each weight is multiplied by an activation, there are both n activations and also each group of weights contains n weights. As a consequence of m being greater than one, the multiplication taking place is a matrix multiplication since the second elements form a two dimensional matrix. It will be appreciated that the average bit width of the weights is 1/m times the bit width of the activations. In other words, the weights are smaller than the activations. By reducing the size of the weights by a factor of m, it is possible to consider m groups of weights (e.g. filters) simultaneously.

In some examples, the bit width of the second elements is four bits or less. The weights could therefore be four bits or less, such as four bits, two bits, or one bit. As the bit width of the activations decreases, it becomes possible to process a comparative number of inputs (e.g. groups of activations) at once. This refers to the elements as stored in the first vector registers and the second vector registers.

In some examples, the bit width of the second elements is one bit. This again refers to the elements as stored in the first vector registers and the second vector registers.

In some examples, the second elements are signed. The signing could be implicit (e.g. by use of a bias and scale). For instance in a situation where the second elements are one bit, this could be achieved by the use of the digits $\{-1, 1\}$, which could be represented by the values $\{1, 0\}$ (i.e., scale by $-2$ and bias by $+1$). By having $-1$ as a value (rather than 0), no information is lost during the multiplication and therefore higher representative power is possible. By choosing $\{1, 0\}$ rather than $\{0, 1\}$, the representation more closely matches standard 2's compliment sign extension bits.

In some examples, the weights are extended prior to the matrix multiplication. Sign extension enables a value to be padded in such a way that it fits within a larger storage circuit without changing the value being stored. For a positive value, this can be achieved by prepending zeros to the most significant bit position. For instance, the sign extension of the positive value 0101 (5 in decimal) to eight bits would be 00000101. In the case of a negative value the padding is achieved by prepending ones to the most significant bit position. For instance, the sign extension of the negative value (in twos complement) 1001 ($-7$ in decimal) to an eight-bit value is 11111001. In practice, for a signed value, the sign extension can be achieved by repeating the most significant bit whereas for an unsigned value, signed extension can be achieved by repeating a zero. The sign extension takes place from the bit width in which the weights are provided in the input/model to a bit width of the multiplication circuitry that performs the multiplication operation. Other forms of extension can take place using scaling and biasing as previously described.

In some examples, the one or more matrix multiplication instructions comprise an indicator value, or the data processing apparatus comprises a selection register configured to store the indicator value; and the indicator value is configured to indicate a subset of the weights that are used in the matrix multiplication during a particular beat of the data processing apparatus. During each beat, parallel multiplications are available. For instance, four pairs of sub-vectors of (binary) weights may be available and the selection register (or a passed in immediate value from the instruction) can be used to indicate which of those pairs of sub-vectors of weights are to be (extended and) multiplied with the activations. For instance, if the selection register (or immediate) contains the value 0×0 will select bits 0, 1, 2, 3 for one sub-vector of weights and 4, 5, 6, 7 (from the same input operand) for a second sub-vector of weights. The value 0×1 in the selection register will select bits 8, 9, 10, 11 for one sub-vector of weights and bits 12, 13, 14, 15 for a second sub-vector of weights, each weight at those locations being multiplied by a vector of 4 activations. In the following beat, 0×1 would now mean selecting bits 40, 41, 42, 43 for one sub-vector of weights and bits 44, 45, 46, 47 for a second sub-vector of weights, each weight at those locations being multiplied by the next vector of 4 activations (bits 0-32 relate to the first beat).

In some examples, bits of at least one of the indication of the set of first elements in the first vector registers and the set of second elements in the second vector registers are used to indicate a subset of the weights that are used in the matrix multiplication during a particular beat of the data processing apparatus. Thus, rather than the selection register or explicit immediate value being used to indicate which bits to use, this can be inferred from other parameters of the instruction.

In some examples, the matrix multiplication instructions comprise a compressed matrix multiplication instruction that comprises an indication of compression data; the first elements comprise a single row of n activations; the second elements comprise m groups of n compressed weights, where m>1; the compression data indicates how the n compressed weights are decompressed to form mn uncompressed weights. In a compressed matrix multiplication instruction, some of the elements of a matrix are only implicitly present. That is, in the actual representation in the vector registers, some elements are excluded. For instance, a sparse matrix can exclude elements having a value of '0' thereby creating a dense matrix. In these situations, compression data is included to indicate how the compressed matrix would be converted to an uncompressed matrix (e.g. to indicate where removed elements are located). Explicit weights may use a full set of bits (similar to the activations) whereas implicit weights may use no bits. As with the uncompressed matrix multiplication instruction, each group of (compressed) weights can relate to a different filter or channel. As a consequence of this, it is possible to store weights relating to more groups/filters/channels. Since the implicit values use up no bits, the average bit width for all (implicit and explicit) weights is smaller than would be achieved with an uncompressed matrix multiply instruction.

In some examples, the compression data comprises a plurality of portions, each applicable to one of a plurality of matrix multiplication instructions including the compressed matrix multiplication instruction; and the compressed matrix multiplication instruction comprises a compression data selector configured to select a portion of the compression data to be applied to form the n uncompressed weights. When the compression data is smaller than the decompressed weights, the contents of a register that stores the compression data can relate to a number of different matrix multiplication operations. Consequently, a selector is used to select which parts of the compression data are used for a current operation.

In some examples, the compression data is applicable to a plurality of the matrix multiplication instructions; at least some of the matrix multiplication instructions indicate different second elements from each other; and the compression data comprises a number of items. A number of matrix multiplication operations may take place—each directed towards different weights of the same channels. In these situations, if the compression data is sufficiently small, the compression data might be applicable to a plurality of the matrix multiplication operations and therefore need not be reloaded after each matrix multiplication operation. Each item could be, for instance, a single sparsity mask relating to a pair of weights that indicate how the two weights can be expanded into four weights by adding predefined values in indicated positions.

In some examples, the compression data is applicable to more than m groups of n weights. Although a single matrix multiplication operation may only operate on m groups of n weights, the compression data can be such that it is relevant to more than m groups of n weights. There are a number of ways in which to store compression data for a number of matrix multiplication operations. However, by prioritising storing more weights for a larger number of channels, as opposed to storing more weights of a smaller number of channels, it is possible to reduce the register pressure (e.g. the number of registers required to store the compression data) while also requiring the compression data to be reloaded less often owing to the ordering of matrix multiplication operations.

In some examples, the items are ordered in the compression data according to a beat in which they are used within the plurality of matrix multiplication operations. For instance, items that are used in a first beat of any of the matrix multiplication operations are clustered together, then items that are used in a second beat of any of the matrix multiplication operations are clustered together and so on.

In some examples, the items are ordered in the compression data such that items used in a same beat of a same single matrix multiplication operation are adjacent. Consequently, a single fetch of contiguous data from the compression data can be performed for each beat of each operation.

In some examples, the compression data selector is least significant bits of another parameter of the compressed matrix multiplication instruction. Least significant bits of the one of the parameters of the instruction can be used to indicate the portion of the compression data that is to be used for that instruction. Consequently, it is possible to save the number of bits necessary to encode an instruction since there is no need to encode the bits necessary to specify the mask selector as a separate parameter.

In some examples, the compression data selector is least significant bits of an address of the second elements. Since the second elements correspond with the (compressed) weights and since the compression data is used to decompress the weights, it is appropriate for the least significant bits of the location of the weights to correspond with the information that is used to specify which data is used to decompress the particular weights being used by the operation.

In some examples, the compression data selector is combinable with a stub address of the first elements to form an address of the first elements; and the compression data selector is combinable with a stub address of a result register to form an address of result register into which at least a part of the result of the matrix multiplication is stored. The stub addresses can be concatenated with the compression data selector bits (placed in a least significant bit position) to form the addresses of the first elements and result register(s).

In some examples, the data processing apparatus comprises multiplexer circuitry configured to select from between the activations to match with the uncompressed weights that are non-zero to provide as an input to the matrix multiplication. The compressed data could take the form of a sparsity mask and may be used to indicate where the provided weights belong within a matrix. For instance, consider the situation in which two weights are provided and it is known that within a series of four position, two '0' values were removed to form the compressed weights. In this situation, two two-bit values can be used to indicate which of the four positions each of the values belongs in. For example '00' and '10' might mean that the first weight belongs in a first position and the second weight belongs in a third position, thus giving the sequence $w_0$, 0, $w_1$, 0. Similarly, '10' and '11' might mean that the first weight belongs in a third position and that the second weight belongs in a fourth position thereby giving the sequence 0, 0, $w_0$, $w_1$. The multiplexer circuitry can therefore be made from a set of multiplexers (one for each possible position-four in these examples) and to use bits from the sparsity mask as an input in order to indicate which input should enter into each position since activations that would have multiplied-accumulated against zero-values can be dropped and only activations multiplied against the compressed weights in expanded form require processing. In other examples, a bitfield might be used to indicate where the non-zero values belong with, for instance, the field 1100 meaning that the non-zero values belong in the first and second positions (out of four).

In some examples, the multiplexer circuitry is configured to select from between a subset of the activations to match with the uncompressed weights that are non-zero. Depending on the form of compression that has been used, there will be situations in which it is not possible for every weight to be present in every possible position. For instance, consider again the previous example in which two non-zero weights have been kept from an initial set of four values. In this situation, the weights might ostensibly belong to any of the four positions. However, certain combinations of location are not possible. For instance, if the first weight belongs to the fourth and final location, there is no location for the second weight to be placed. Similarly, if the second weight belongs to the first location, there is no location for the first weight to be placed. By recognising this, it is possible to limit the number of inputs that the multiplexer circuitry considers and therefore the multiplexer circuitry might only choose from a subset of the activations for particular positions.

In some examples, there is provided a data processing apparatus comprising: input circuitry configured to receive a matrix in a first format comprising a plurality of values; output circuitry configured to output the matrix comprising the plurality of values in a second format; and adjustment circuitry configured to perform a modification of the matrix from the first format to the second format, wherein the second format is computationally contiguous in respect of a data processing apparatus having first vector registers and second vector registers, both configured to be dynamically spatially and dynamically temporally divided, performing a matrix multiplication using the matrix.

In order to quickly get data in and out of the previously mentioned data processing apparatus, which features the dynamically spatially and dynamically temporally dividable vector registers, it may be necessary to provide the data in a given format. This makes it possible for the matrix multiplication instruction to execute efficiently by providing it with the data in a manner that enables the operation to proceed without having to scan and parse the data into a form where execution can occur in a parallelised manner. This can be achieved by a further data processing apparatus that performs a pre-processing step of transforming the data (e.g. the values or weights of a matrix or model) from a first format to a second format that is more suitable. The second format is such that it is computationally contiguous to the data processing apparatus having the first vector registers and second vector register. This makes it possible for computation to occur without the parsing having to take place at a time of execution. In other words, elements of the model in the second format can be taken and processed (computed) without being reordered.

In some examples, the values comprise a first set and a second set, each of which are to be multiplied by a single set of activations in the matrix multiplication; in the first format, the first set forms a first contiguous grouping and the second set forms a second contiguous grouping; and the adjustment circuitry is configured to interleave the values of each of the first set and the second set to produce the second format by performing a 'z' shaped scan over the first set and second set. The values (e.g. weights) are therefore modified so that rather than all of the values for one input (e.g. model) being together, they are split—possibly repeatedly. For instance, in a second model, a weight of the first set could be followed by a weight of the second set and then a weight of the first set in an alternating manner. When representing the first set and a second set in the form of a matrix (having columns and rows) the 'scanning' that is performed thus forms the shape of a 'z'. By presenting the weights in this way, the weights can be input into the processing circuitry in such a way that one group of activations can be applied (at a time) to elements of the first set and the second set.

In some examples, the first set and the second set are interleaved in blocks of size p in the second format; and p is equal to a number of the activations that are multiplied simultaneously in the matrix multiplication, where p>1. The interleaving need not be alternation between the first and second sets-one value after another. In some examples, a block of elements of the first set are followed by a block of elements of the second set and then several elements of the first set. The number of elements could be the same each time, e.g. p elements from the first set followed by p elements of the second set and so on. The value p could be selected to correspond with the number of multiplications that can occur simultaneously in the matrix multiplication. For instance if p=4 then four values from the first set might be followed by four values from the second set, followed by four values from the first set, and four values of the second set etc. until all of the values have been repositioned in this way.

In some examples, the adjustment circuitry is configured to interleave the first set and the second set into blocks of size p by performing a two-layer interleaving in which the 'z' shaped scan is performed p times over the first set and the second set. For example, the 'z' shaped scan could take a first group of values from the first set and a second group of values from the second set. This could then be followed by another set of values from the first set at a position 1+q and another set of values from the second set at a position 1+q, followed by another set of values from position 1+2q in the first set and another set of values from position 1+2q in the second set, then another set of values from position 1+3q in the first set and another set from position 1+3qth from the second set. These collectively form a first 'z' shaped scan. A next 'z' shaped scan could then comprise a similarly sized set of values from position r in the first set, followed by r in the second set, followed by r+q in the first set, and r+q in the second set, then r+2q in the first set, and r+2q in the second set, and then r+3q in the first set and r+3q in the second set. This could then be followed by a third 'z' shaped scan, and so on. Each 'z' therefore takes values (e.g. weights) that are to be multiplied by a same subset of (e.g. activations) with the value 'q' being representative of the number of activations that are present.

In some examples, in the second format, within a contiguous q blocks of size p, the values are grouped according to their position within the first set and the second set. The first set of values and the second set of values are interleaved to form q blocks of size p. Across the q blocks as a whole, the values from each set maintain an ordering, relative to other values in that set, that they had in the first format. This makes it possible for the generation of predicate masks to proceed in the same manner as for other instructions. In particular, since the relative ordering within each set has not been disturbed, a loop counter can be used to compare a number of elements of a vector (or matrix) that have been executed so far as compared to the total number of elements of that vector (or matrix). This can then be used to generate a predicate mask to indicate those elements that should be executed in a next iteration. Within a single beat of the data processing apparatus (that has the first vector registers and the second vector registers) all of the values (e.g. weights) within the q blocks of size p would be expected to be processed. That is q*p values can be processed within a single beat.

In some examples, each weight has an index j within a set i; and in the second format, within each q blocks of size p, the values are ordered firstly according to their index j and secondly according to their set i. A value (e.g. weight) may be defined as having a position (i, j) where the i is the set number or channel number that the value (e.g. weight) belongs to, and j is the index number into that set number or channel. In the second format, in a given q blocks of size p, all of the values having j=0 are firstly grouped together and they are ordered (amongst themselves) in order of i. Then all the values having j=1 are grouped together, again ordered (amongst themselves) in order of i, and so on.

In some examples, the adjustment circuitry is configured to perform the modification in a single stage. That is, no intermediate formats are produced between the first format and the second format. Instead, all reorderings are done at once. In other embodiments, an intermediate format might be produced. For instance, one form of interleaving might be carried out (e.g. the 'z' shaped scan) and then, having produced an ordering of the values, a further reordering might be carried out within each q blocks of size p.

In some examples, the values comprise compressed weights; the output circuitry is configured to output compression data; and the compression data comprises a plurality of items, which indicate how the compressed weights can be decompressed into decompressed weights. The weights in the model of the first format could already be compressed weights, in which case the compression data is provided along with the model. Alternatively, the weights in the model of the first format could be decompressed weights. In this situation, the data processing apparatus may perform the compression and generate the compression data.

In some examples, the compression data is applicable to a plurality of matrix multiplication instructions; and at least some of the matrix multiplication instructions indicate different compressed weights from each other. The compression data is thereby applicable to a number of different matrix multiplication instructions.

In some examples, the compression data is applicable to more than two sets of compressed weights. When the compression data for a weight is smaller than the weight itself, it is possible to store compression data for multiple matrix multiplication instructions, each of which may relate to different weights. There are two ways in which this fact can be used to store a large amount of compression data. One is to store a larger number of weights for a small number of channels (sets of weights). The other is to store a smaller number of weights for a large number of channels. By storing the latter, i.e. by storing compression data in relation to more than two channels, it is possible to reduce register pressure. In other words, it is possible to reduce the number of registers needed to store the compression data while limiting the number of loads of compression data into registers that take place.

In some examples, the items are ordered in the compression data according to a beat in which they are used within the plurality of matrix multiplication instructions. For instance, items that are used in a first beat of any of the matrix multiplication operations are clustered together, then items that are used in a second beat of any of the matrix multiplication operations are clustered together and so on.

In some examples, the items are ordered in the compression data such that items used in a same beat of a same single matrix instruction operation are adjacent. Consequently, a single fetch of contiguous data from the compression data can be performed for each beat of each operation.

Particular embodiments will now be described with reference to the figures.

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example the decoder 6 may interpret the opcodes of the decoded instructions and any additional control fields of the instructions to generate control signals which cause a processing circuitry 4 to activate appropriate hardware units to perform operations such as arithmetic operations, load/store operations or logical operations. The apparatus has a set of registers 10 for storing data values to be processed by the processing circuitry 4 and control information for configuring the operation of the processing circuitry. In response to arithmetic or logical instructions, the processing circuitry 4 reads operands from the registers 10 and writes results of the instructions back to the registers 10. In response to load/store instructions, data values are transferred between the registers 10 and the memory system 8 via the processing circuitry. The memory system 8 may include one or more levels of cache as well as main memory.

The registers 10 include a scalar register file 12 comprising a number of scalar registers for storing scalar values which comprise a single data element. Some instructions supported by the instructions decoder 6 and processing circuitry 4 are scalar instructions which process scalar operands read from scalar registers 12 to generate a scalar result written back to a scalar register.

The registers 10 also include a vector register file 14 which includes a number of vector registers each for storing a vector value comprising multiple data elements. In response to a vector instruction, the instruction decoder 6 controls the processing circuitry 4 to perform a number of lanes of vector processing on respective elements of a vector operand read from one of the vector registers 14, to generate either a scalar result to be written to the scalar registers 12 or a further vector result to be written to a vector register 14. Some vector instructions may generate a vector result from one or more scalar operands, or may perform an additional scalar operation on a scalar operand in the scalar register file as well as lanes of vector processing on vector operands read from the vector register file 14. Hence, some instructions may be mixed-scalar-vector instructions for which at least one of one or more source registers and a destination register of the instruction is a vector register 14 and another of the one or more source registers and the destination register is a scalar register 12. Vector instructions may also include vector load/store instructions which cause data values to be transferred between the vector registers 14 and locations in the memory system 8. The load/store instructions may include contiguous vector load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or store data from respective elements of a vector register to the discrete addresses.

The processing circuitry 4 may support processing of vectors with a range of different data element sizes. For example a 128-bit vector register 14 could be partitioned into sixteen 8-bit data elements, eight 16-bit data elements, four 32-bit data elements or two 64-bit data elements for example. A control register within the register bank 10 may specify the current data element size being used, or alternatively this may be a parameter of a given vector instruction to be executed. Consequently, the registers can be said to be dynamically spatially divided.

The registers 10 also include a number of control registers for controlling processing of the processing circuitry 4. For example these may include a program counter register 16 for storing a program counter address which indicates an address of an instruction corresponding to a current execution point being processed, a link register 18 for storing a return address to which processing is to be directed following handling of a function call, a stack pointer register 20 indicating the location within the memory system 8 of a stack data structure, and a beat status register 22 for storing beat status information which will be described in more detail below. It will be appreciated that these are just some of the types of control information which could be stored, and in practice a given instruction set of architecture may store many other control parameters as defined by the architecture. For example, a control register may specify the overall width of a vector register, or the current data element size being used for a given instance of vector processing.

An architecture may support the overlapping of vector instructions. For instance, a load instruction VLDR and a vector multiply accumulate (VMLA) instruction can be executing at the same time, even if there are data dependencies between them. This is because each vector instruction only executes on a subset of values at a time and once a first instruction has operated on a first subset of values, a second instruction is then able to use those values, so execution of the VMLA can start before execution of the VLDR has finished. By allowing the instructions to overlap, expensive execution blocks like multipliers can be kept active more of the time.

Figure 2:
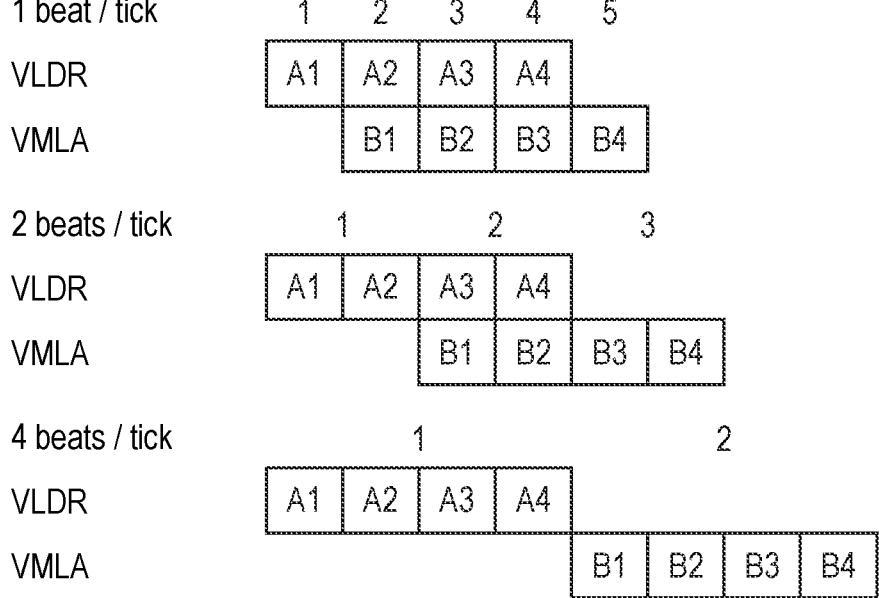
FIG. 2 shows a range of overlaps of instructions.

A range of overlaps of instructions may be possible, as shown in examples of FIG. 2. The execution of a vector instruction is divided into parts referred to as "beats", with each beat corresponding to processing of a portion of a vector of a predetermined size. A beat is an atomic part of a vector instruction that is either executed fully or not executed at all, and cannot be partially executed. The size of the portion of a vector processed in one beat is defined by the architecture and can be an arbitrary fraction of the vector. In the examples of FIG. 2 a beat is defined as atomic processing of lanes at one quarter of the vector length so that there are four beats per vector instruction. Clearly, this is just one example and other architectures may use different beat lane widths, e.g. 64-bit lanes, or numbers of beats, e.g. two or eight. The portion of the vector corresponding to one beat can be the same size, larger or smaller than the data element size of the vector being processed. Hence, even if the element size varies from implementation to implementation or at run time between different instructions, a beat is a certain fixed width of the vector processing. If the portion of the vector being processed in one beat includes multiple data elements, carry signals can be disabled at the boundary between respective elements to ensure that each element is processed independently. If the portion of the vector processed in one beat corresponds to only part of an element and the hardware is insufficient to calculate several beats in parallel, a carry output generated during one beat of processing may be input as a carry input to a following beat of processing so that the results of the two beats together form a data element.

As shown in FIG. 2 different micro-architecture implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known micro-architecture techniques such as pipelining may mean that a single tick may require multiple clock cycles to perform at the hardware level, and indeed that a single clock cycle at the hardware level may process multiple parts of multiple instructions. However such micro-architecture techniques are not visible to the software as a tick is atomic at the architecture level. For conciseness such micro-architecture techniques are ignored during further description of this disclosure.

As shown in the lower example of FIG. 2, some implementations may schedule all four beats of a vector instruction in the same tick, by providing sufficient hardware resources for processing all the beats in parallel within one tick. This may be suitable for higher performance implementations. In this case, there is no need for any overlap between instructions at the architectural level since an entire instruction can be completed in one tick.

On the other hand, a more area efficient implementation may provide narrower processing units which can only process two beats per tick, and as shown in the middle example of FIG. 2, instruction execution can be overlapped with the first and second beats of a second vector instruction carried out in parallel with the third or fourth beats of a first instruction, where those instructions are executed on different execution units within the processing circuitry (e.g. in FIG. 2 the first instruction is a load instruction executed using the load/store unit 200 and the second instruction is a multiply accumulate instruction executed using the MAC 202).

A yet more energy/area-efficient implementation may provide hardware units which are narrower and can only process a single beat at a time, and in this case one beat may be processed per tick, with the instruction execution overlapped and staggered by one beat as shown in the top example of FIG. 2.

It will be appreciated that the overlaps shown in FIG. 2 are just some examples, and other implementations are also possible. For example, some implementations of the processing circuitry 4 may support dual issue of multiple instructions in parallel in the same tick, so that there is a greater throughput of instructions. In this case, two or more vector instructions starting together in one cycle may have some beats overlapped with two or more vector instructions starting in the next cycle.

As well as varying the amount of overlap from implementation to implementation to scale to different performance points, the amount of overlap between vector instructions can also change at run time between different instances of execution of vector instructions within a program. Hence, the processing circuitry 4 may be provided with beat control circuitry 30 as shown in FIG. 1 for dynamically controlling the temporal division—e.g. the timing at which a given instruction is executed relative to the previous instruction. This gives the micro-architecture the freedom to select not to overlap instructions in certain corner cases that are more difficult to implement, or dependent on resources available to the instruction. For example, if there are back to back instructions of a given type (e.g. multiply accumulate) which require the same resources and all the available MAC or ALU resources are already being used by another instruction, then there may not be enough free resources to start executing the next instruction and so rather than overlapping, the issuing of the second instruction can wait until the first has completed.

Figure 3:
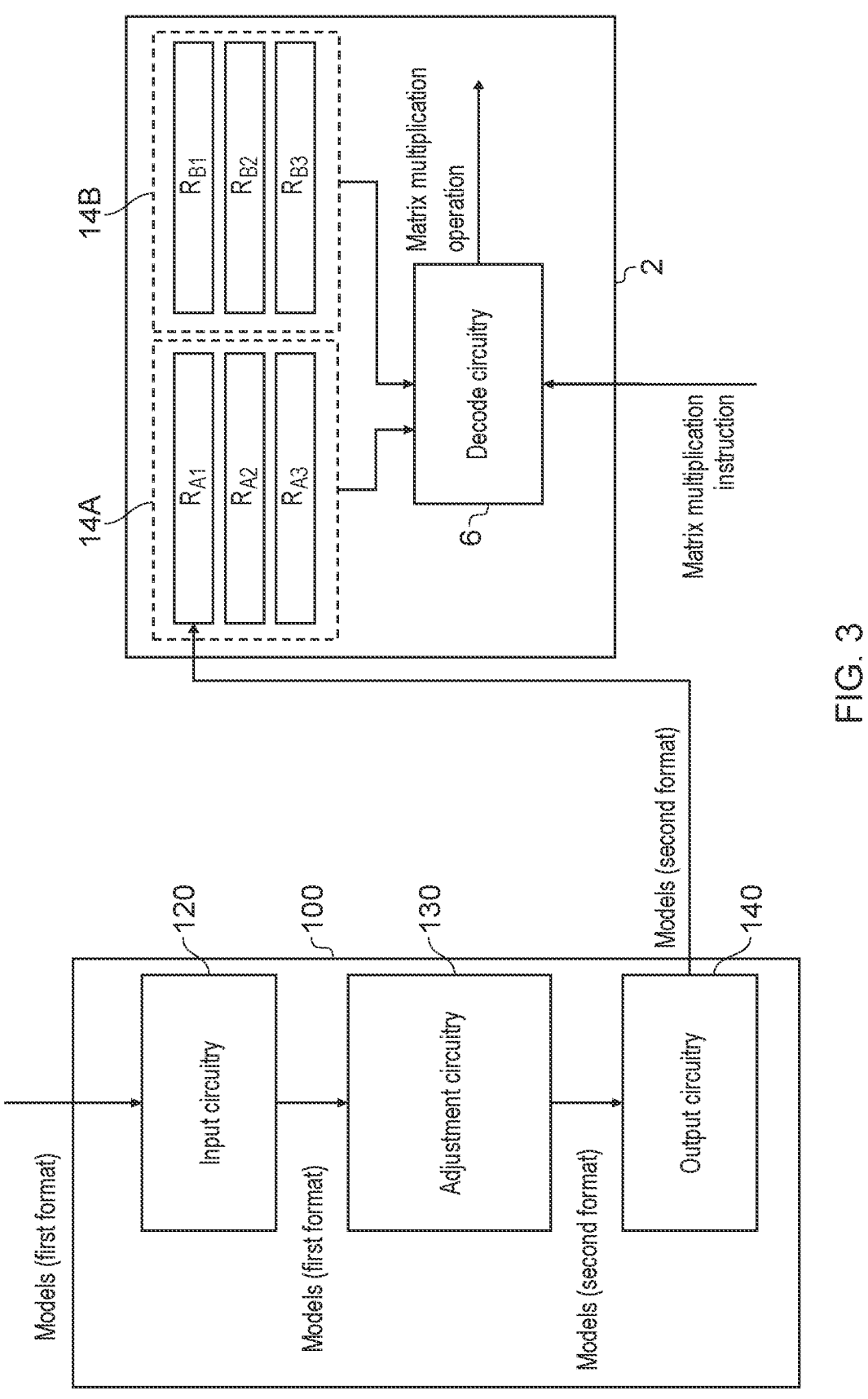
FIG. 3 shows a data processing apparatus in the form of a pre-processor.

FIG. 3 shows a data processing apparatus 100 in the form of a pre-processor. The pre-processing apparatus 100 takes models in a first input, which are received by input circuitry 120. The models comprise, for instance, set of weights each associated with an input to be tested by a neural network. From there, adjustment circuitry 130 modifies the models in order to produce models in a second format, which are output by the output circuitry 140. The adjustment circuitry 130 adjusts the models so that in the second format, the weights are rearranged and in this way can be inserted into a second data processing apparatus 2 and processed without re-parsing or 'randomly' (rather than sequentially) accessing the models. In this way, the second format is said to be computationally contiguous for the second data processing apparatus 2.

In the second data processing apparatus 2, the models are received and stored in a number of vector registers $R_{A1}$, $R_{A2}$, $R_{A3}$ in a first set or bank 14A of vector registers. A second set or bank 14B of registers $R_{B1}$, $R_{B2}$, $R_{B3}$ stores a corresponding set of activations. The decode circuitry 6 receives a matrix multiplication instruction and from this, generates a matrix multiplication operation. The neural network operates by performing multiplications between weights and activations. Ordinarily, at a single neuron, a set (vector) of weights would be multiplied by a set (vector) of activations.

The weights in the model of the second format and the activations each have different bit widths. For instance, each of the weights might be 4 bits and each of the activations might be 8 bits. By using a small bit width for the weights, the model can be made smaller. However, by keeping the activations bigger, it is possible to still produce good results from a neural network. Additionally, the data processing apparatus 2 is able to use the smaller sized weights in order to achieve improved throughput. In particular, by carefully arranging the weights (as achieved by the adjustment circuitry 130) of two channels of a model, it is possible for both channels to be processed simultaneously or in parallel. This process will be illustrated in the following figures.

Figure 4A:
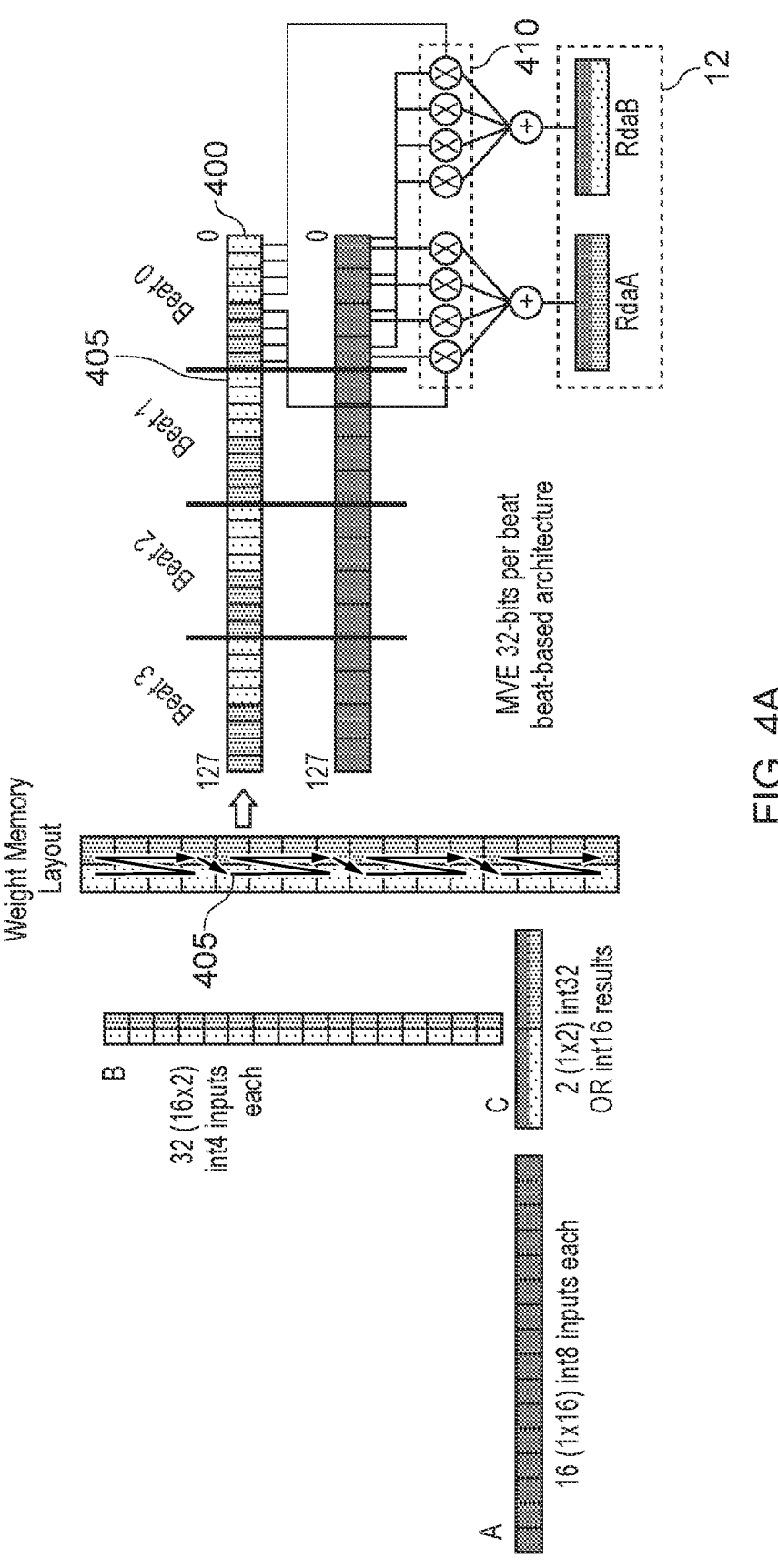
FIG. 4A illustrates the effect of the data processing apparatuses in pre-processing for and executing a matrix multiplication instruction.

FIG. 4A illustrates the effect of the data processing apparatuses in pre-processing for and executing a matrix multiplication instruction. Here the matrix multiplication instruction is of the form:

VMLAMAV.S8 RdaA, RdaB, Qn, Qm

Where 'S8' refers to the fact that the activations are of 8 bits, 'RdaA' is the location of a scalar register into which the first set of result bits are placed, 'RdaB' is the location of a scalar register into which the second set of result bits are placed, 'Qn' is the location of a vector register from which activations are placed into a series of processing lanes, and 'Qm' is the location of a vector register from which weights are placed into the processing lanes.

The pre-processing is performed by the pre-processing data processing apparatus 100. The input channels are shown as an input B. Each channel consists of 16 weights, each of four bits. There are two models within the input and therefore a total of 32 weights. Another input A is the set of 16 activations. Each activation is 8 bits. A node of the neural network therefore multiplies each activation by a corresponding weight (e.g. weight 1 by activation 1, weight 2 by activation 2 and so on). The results of each multiplication for the weights of a model are added together. Therefore, for two channels, there are two results produced (either 16-bit or 32-bit) within a pair of scalar registers at C (corresponding to RdaA and RdaB in the above instruction definition).

In the present technique, the weights belonging to the two channels are interleaved to produce the channels in the second format. This is achieved by a 'z' shaped scan across the weights. The 'z' shape is derived from the fact that the scan passes through a first group of contiguous weights from the first channel, then a second group of contiguous weights in the second channel, followed by a third group of contiguous weights in the first channel (that immediately followed the first group of contiguous weights), and then a fourth group of contiguous weights (that immediately followed the second group of contiguous weights) and so on. The 'z' shaped scan can therefore be seen as an ordered interleaving of blocks of values within the channels. In this example, each grouping is of four weights leading to a 'striped' combined set of channels 400 presented in 128 bits. The term 'p' refers to the number of weights in each block. This also corresponds to the number of activations that are simultaneously multiplied. Meanwhile, the term 'q' is used to indicate the number of channels for which entries are processed simultaneously.

In a first beat (beat 0), a set of multipliers 410 multiply each weight of a first and second channel by an activation. The results of the multiplications for the first channel are added together and stored in a scalar register. The results of the multiplications for the second channel are added together and stored in a second scalar register (in some embodiments, a single register could be used to store both multiplication accumulators). Because weights of the first and second channel are interleaved, it is possible to use the same set of activations for both sets of multiplications without requiring any data from beyond the 32-bit lane boundary associated with beat 0. This is important because the activations have a higher bit width than the weights (8-bit vs 4-bit) and so within the vector registers, a smaller number of activations can be stored as compared to the number of weights. Over a series of four beats, each of the weights of the two channels are multiplied by the set of activations—with half of the multiplications of each beat being directed to one channel and half of them being directed to the second channel.

Since the same set of activations is used for each set of multiplications, the number of load operations can be kept small. Indeed, in some situations, the ratio of load operation to computational operations can be kept at, or near, to 1:1.

It will be appreciated that, therefore, the effective operation being performed is a matrix multiplication operation. This is because each of the weights of two channels is multiplied by a single set of activations and the results added together. In other words, and in the example of FIG. 4A, a (1×16) matrix is multiplied by a (16×2) matrix (or vector). The second of these inputs is two dimensional and therefore the operation in question is a matrix multiplication. However, the apparatus illustrated in FIG. 4A achieves the matrix multiplication by an interleaving of the (2×16) inputs. This enables the multiplication to proceed efficiently by avoiding lane boundary crossings in a beat-based context.

With vector processing, one might use a 'predicate mask' in order to indicate particular entries of the vector that are not to be processed. For instance, it has been assumed in FIG. 4A that the matrix multiplication parameters exactly fit within the beats. If, instead, the multiplication to be performed was a 1×17 matrix by a 17×1 matrix then this may not fit within all of the beats. The operation would therefore be looped so that in a first iteration, a first set of the elements are multiplied and in a second iteration, a second set of the elements are multiplied. This is fine provided that the total number of elements fits and fills up the registers completely within a multiple of the number of the register size. However, if this is not the case, it is appropriate to provide a mechanism for indicating that particular elements in the beats should not be processed. Without this, 'junk' data that still exists will be computed and will affect the final result.

FIG. 4A shows four beats of 32 bits. This allows for the multiplication of a 16×2 matrix of 4-bit weights. If, however, the weights formed a 17×2 matrix then this would have to be carried out over two iterations with the second iteration only multiplying a 1×2 matrix of weights. In this situation, a predicate mask is used to indicate that in the second iteration, only part of one of the beats (the part holding the 2×1 matrix elements) should be processed.

The predicate mask can be generated by a simple loop counter since it is known a priori how many elements are processed per operation and it is known how many elements are to be processed in total. A running count of remaining elements to be processed can therefore be kept. This can in turn be used to generate the predicate mask at each iteration. In these examples, each multiplication by an activation is performed twice (once for each channel) and therefore each entry in a predicate mask refers to a pair of values. Thus, the predicate mask in the previous example might be a one followed by 15 zeros (one entry for each element that is multiplied twice, i.e. for each activation).

However, the beat-width 2×4 matrix 'z' shaped reshape illustrated with respect to FIG. 4A causes the elements to be rearranged and so the weights no longer appear in sequential order. Consequently, a further step is taken to allow the predicate mask to be produced using the loop counter.

Figure 4B:
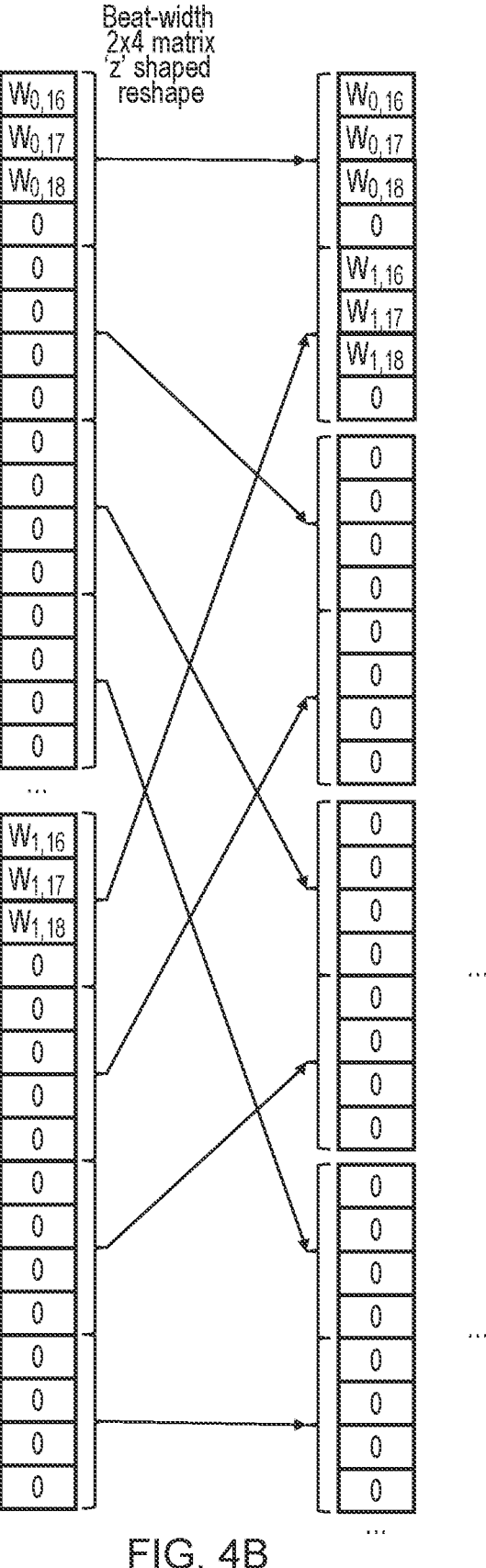
FIG. 4B illustrates the effect of pre-processing.

The first method is illustrated with respect to FIG. 4B. In this technique, each channel of the model is 'padded' with null entries (0s) that have no effect on the computation being performed. The padding is performed such that each channel is expanded to a multiple of the total beat width (32×4 in the case of FIG. 4A). The predicate mask produced for these instructions will now be entirely Is for these instructions because there is no 'overhang' of elements. That is, the full set of elements or weights exactly fit into the beats over a whole number of iterations.

A downside with this approach is that it causes the model consisting of the channels to become bloated with extra unnecessary data. Furthermore, it causes null computations to be unnecessarily performed. Even though these null computations might not affect the final result, and might even be easy to perform, they still require some processing to be performed.

Figure 4C:
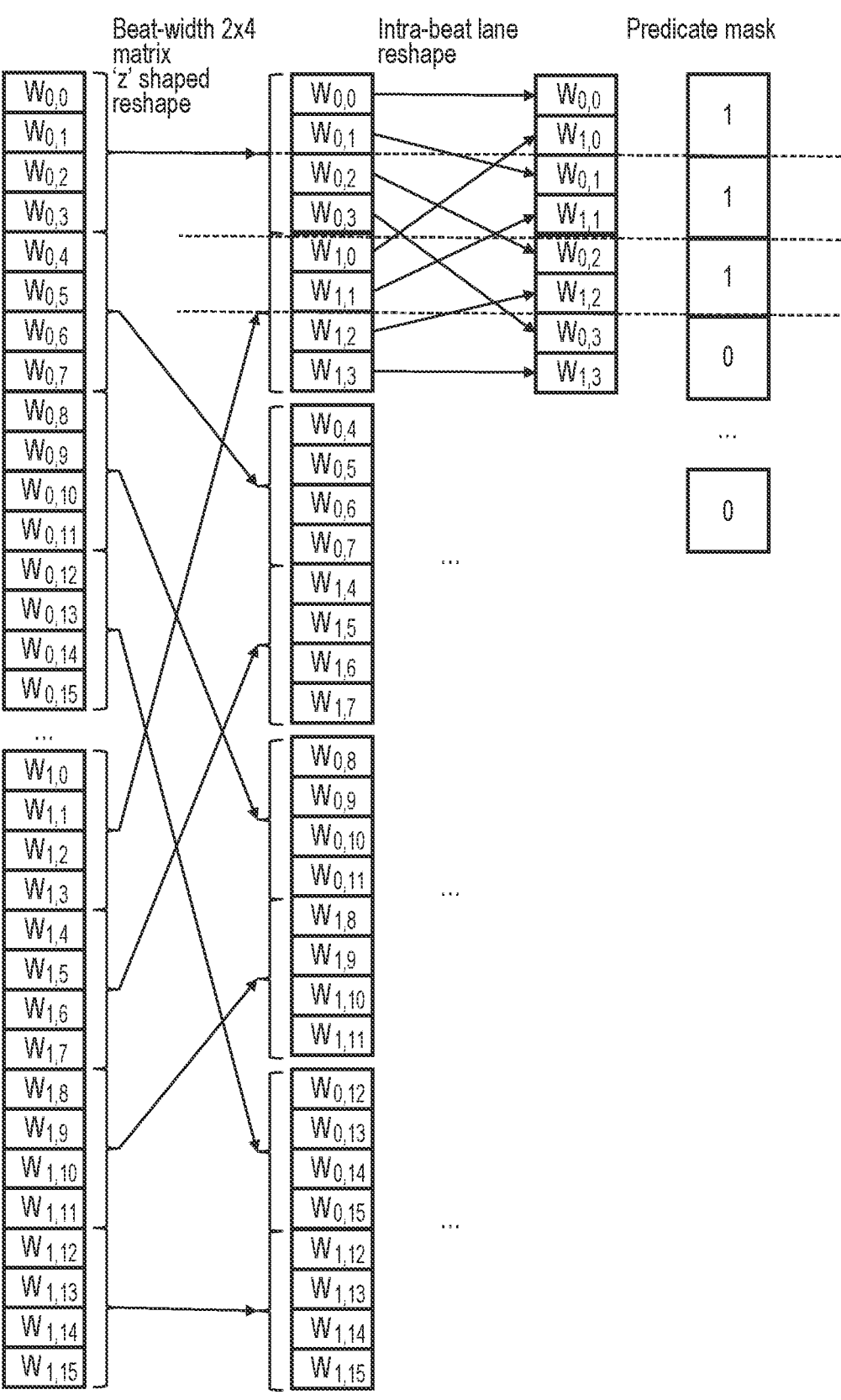
FIG. 4C illustrates the effect of further pre-processing.

FIG. 4C illustrates an alternative in which intra-beat reshaping is performed e.g. by the pre-processor 100 in order to avoid the model bloat and unnecessary computation that takes place in FIG. 4B. In FIG. 4C, this intra-beat reshaping is shown to take place on the data structure that has been produced as a result of the 'z' shaped reshaping (q=2, p=4). However, it is of course possible to perform both reshapes in a single step-FIG. 4C is provided primarily to illustrate the nature of the intra-beat reshaping that occurs. In particular, the intra-beat reshaping rearranges the elements within each beat as determined by the 'z' shaped reshape. In these examples, eight weights (elements) are processed together in a beat and therefore the intra-beat reshaping occurs within each block of eight weights. The intra-beat reshaping causes elements within the beat to be grouped together based on their order within each channel. Phrased differently, the weights $W_{i,j}$ (where i is the channel index and j is the weight index within that channel) that are processed together in a given beat are reordered firstly according to j and then according to i. Thus, as shown in FIG. 4C, elements $W_{0,0}$, $W_{0,1}$, $W_{0,2}$, $W_{0,3}$, $W_{1,0}$, $W_{1,1}$, $W_{1,2}$, $W_{1,3}$, which are processed within a first beat, are reordered to $W_{0,0}$, $W_{1,0}$, $W_{0,1}$, $W_{1,1}$, $W_{0,2}$, $W_{1,2}$, $W_{0,3}$, $W_{1,3}$.

Generating the predicate mask can now proceed in the previously described manner using a loop counter. If there are three weights per channel (e.g. $W_{0,0}$, $W_{0,1}$, $W_{0,2}$, $W_{1,0}$, $W_{1,1}$, $W_{1,2}$) that 'overhang' then the predicate mask can be set to three ones followed by 12 zeros. As before, each entry of the predicate mask corresponds with a number of weights equal to the number of channels, since each the corresponding weight of each channel is multiplied by the same activation. Note that without the inter-beat reshape (i.e. looking only at the structure that is generated after the 'z' shaped rescan, there are weights that will be multiplied that are not desired. For instance, the weight $W_{0,3}$ would be multiplied (which is not in the overhang) and the weight $W_{1,2}$ would not be multiplied (which is in the overhang).

Figure 5:
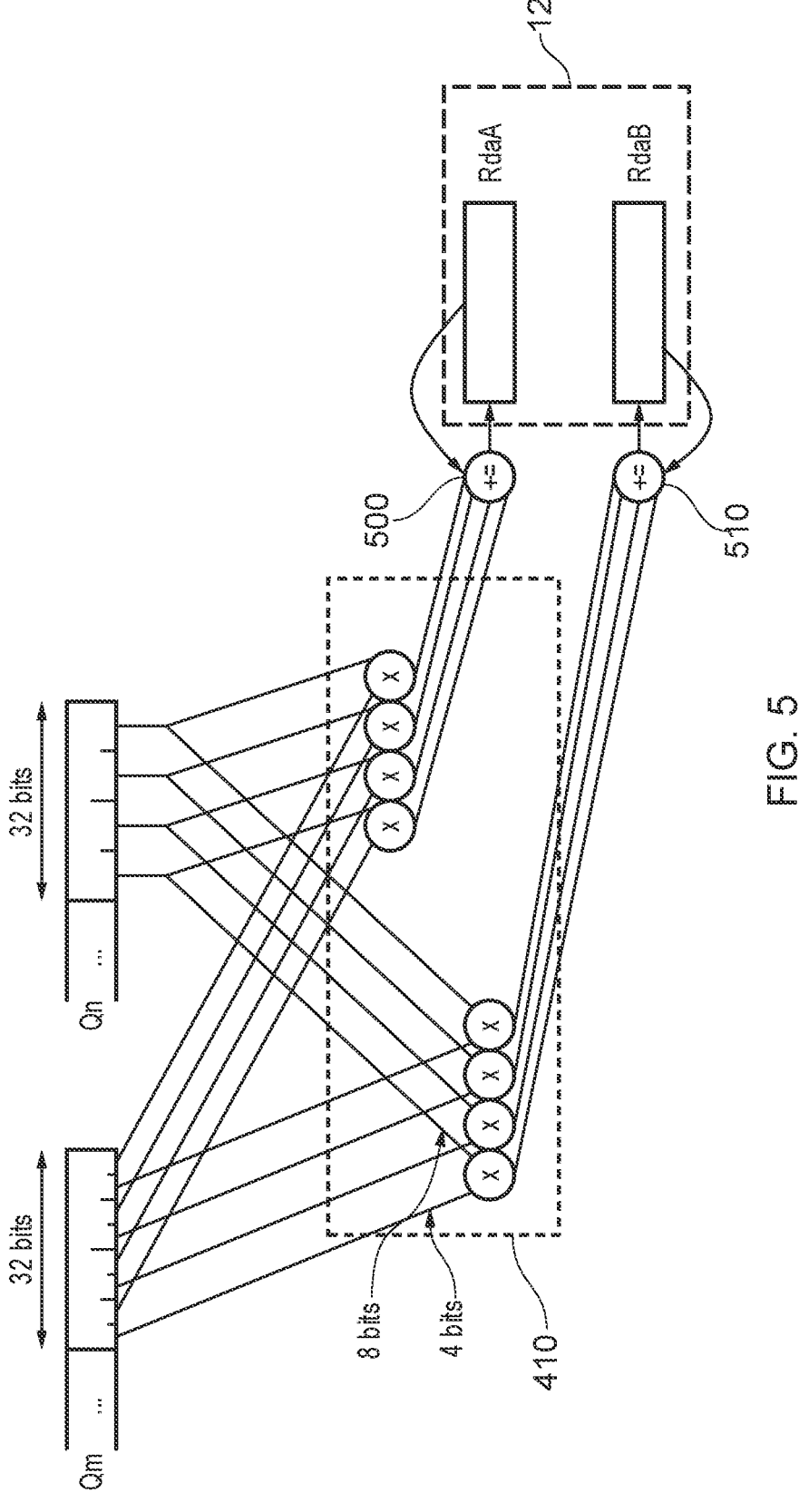
FIG. 5 shows the multiplications that are performed by the multiplication circuitry and the relationship between the inputs in more detail.

FIG. 5 shows the multiplications that are performed by the multiplication circuitry 410 and the relationship between the inputs in more detail. In this example, eight weights each of four bits, for a total of 32 bits, are accessed in one beat from a first vector register Qm. Also in the same beat, four activations each of eight bits, for a total of 32 bits, are accessed from a second vector register Qn. The eight weights are made up from four weights of a first channel and four weights of a second channel. Thus, the four activations are multiplied by each of the first set of four weights and each of the second set of four weights. The results of the multiplications are added together. That is, the first set of four multiplications are added together by a first adder 500 and the second set of four multiplications are added together by a second adder 510. The results are stored in a first scalar register RdaA and second scalar register RdaB respectively.

In each subsequent beat, different sets of activations and weights are multiplied together. Those weights belonging to the first channel are added together by the same adder 500 and those weights belonging to the second channel are added together by the same adder 510. In each case, the results of the additions are added to the results kept in the scalar registers RdaA, RdaB. Thus, by the end of the four beats, the scalar registers RdaA, RdaB store the results of the matrix multiplications.

Since the weights are of a smaller size than the activations (4 bits and 8 bits respectively in this example), it is possible to store more weights in the same space. By organising the weights of multiple channels in the freed up space, and by organising the weights carefully, it is possible to process the additional weights simultaneously.

In this example, a pair of scalar registers RdaA, RdaB are used to output the data. In practice, the number of connections or ports required to implement a second scalar register can be reduced by assuming that one of the accumulators/adders 500 always outputs data to an even register number and the other accumulator/adder 510 always outputs to an odd register number so they will always map to different memory banks within the register file (when the register file is microarchitecturally split to be even/odd banked).

Since the present techniques are applied to a beat-based architecture in which the registers can be both temporally and spatially divided as required, it is possible to use the same hardware to process either larger elements or smaller elements as desired.

Figure 6:
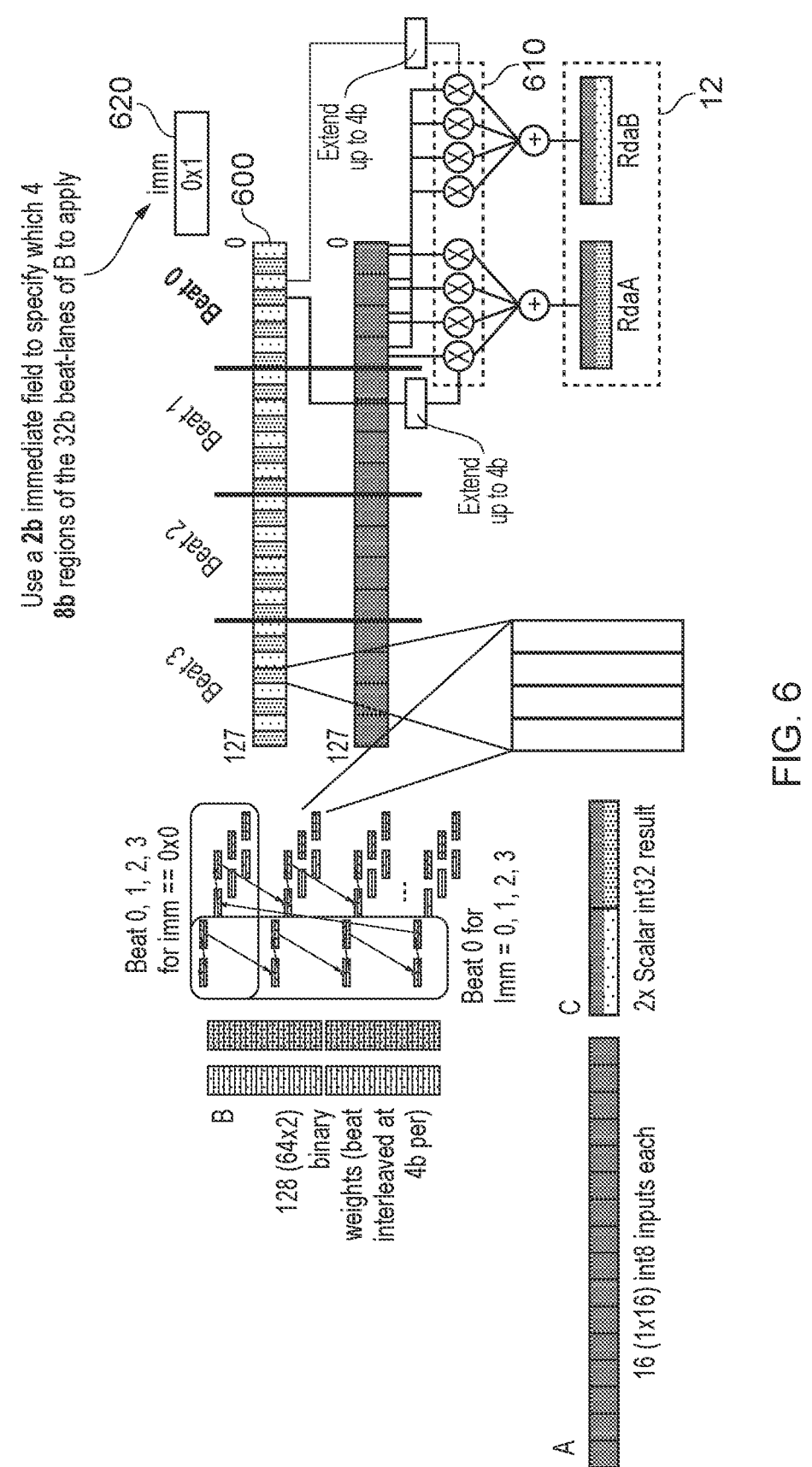
FIG. 6 shows an arrangement in which each weight is only 1-bit.

FIG. 6 shows a similar arrangement in which each weight is only 1-bit. In this example, therefore, there are a total of 128 bits relating to eight different channels (16 bits per channel). In input B, these are arranged as a (64×2) matrix.

In this example, the pre-processing stage achieves a two-layer interleaving by repeatedly performing the 'z' shaped scan to produce the striped output 600. As with the example of FIG. 5, each 'z' shaped scan takes a group of weights from each channel. However, in the example of FIG. 6, due to the size of each weight and the number of channels, the 'z' shaped scan repeatedly jumps. That is, after taking four weights from the first channel (in the first row of the matrix) and four weights from the second channel (in the second row of the matrix) to produce the output 600, the scan jumps to the first four weights of the third channel, which is further down the first row. The scans are therefore non-continuous in that within a particular iteration of the scan, several entries will be skipped. The second iteration then returns to near the top of the first column for the next four entries (indeed, this group of entries may start where the first group of entries first taken from the first column ended—that is, from entry 5 of the first column).

During execution by the execution data processing apparatus 2 there are many more individual (and narrower) B inputs than when processing the 4-bit matrix held in B in FIG. 4A. Since the multiplier circuitry 610 is expected to be similar to or the same as the multiplier circuitry 410 from FIG. 4A for HW area efficiency reasons, 610 also consists of 8 multipliers expected to process 2 channels of data and store the result to 2 output scalars. This means each instance of instruction execution must select 8 of the 1-bit inputs from B of the available 32 1-bit values. A selection register imm 620 is used to store which contiguous eight bits (four from two channels) are to be processed by the multiplication circuitry 610 for a particular beat. As with the example of FIG. 5, the bits are loaded into multiplication circuitry 610 and are multiplied by the activations with the results provided into scalar register RdaA and RdaB As each weight is loaded into the multiplication circuitry 610 it is extended (e.g. to four bits). That is, in the case of an unsigned number or a signed positive number, the most significant bits are filled with 0 and in the case of a signed negative number, the most significant bits are filled with 1. In the case where the second elements are one bit and the digits {−1, 1} are represented by the values {1, 0}, 1 would be extended to 0b1111 and 0 would be extended to 0b0001.

It will be appreciated that in this example, still only a pair of scalar registers are provided. This is because the operation is effectively processing a vector-matrix product of 16 8-bit values from A (1×16) and 32 1-bit values from B (16×2) which has 2 result terms (1×2). Again, this 16×2 from B is only a portion of the available 64×2 terms held within. Typical usage in practice would see 4 vector registers loaded with consecutive vectors so a virtual 1×64 vector (spread across these 4 vector registers) is available for multiplication against all of the 64×2 contents held in B. The operation would then be to execute the instruction 4 times with different A registers (in consecutive order) and the different, matching immediate terms (0×0, 0×1, 0×2, 0×3) to properly multiply-accumulate each 1×16 piece of the larger virtual 1×64 with the corresponding 16×2 piece of B. This 4-instruction sequence would complete a vector-matrix product of 64 8-bit values (1×64) and the 128 1-bit values in B (64×2), which has 2 accumulated result terms (1×2). As will be shown with respect to FIGS. 14A and 14B, other parameters of the instruction (such as the address of the A registers) can be used to determine the immediate terms.

Note that the inter-beat reshaping is equally applicable to the situation in FIG. 6 where each weight is only 2-bits in size.

Figure 7:
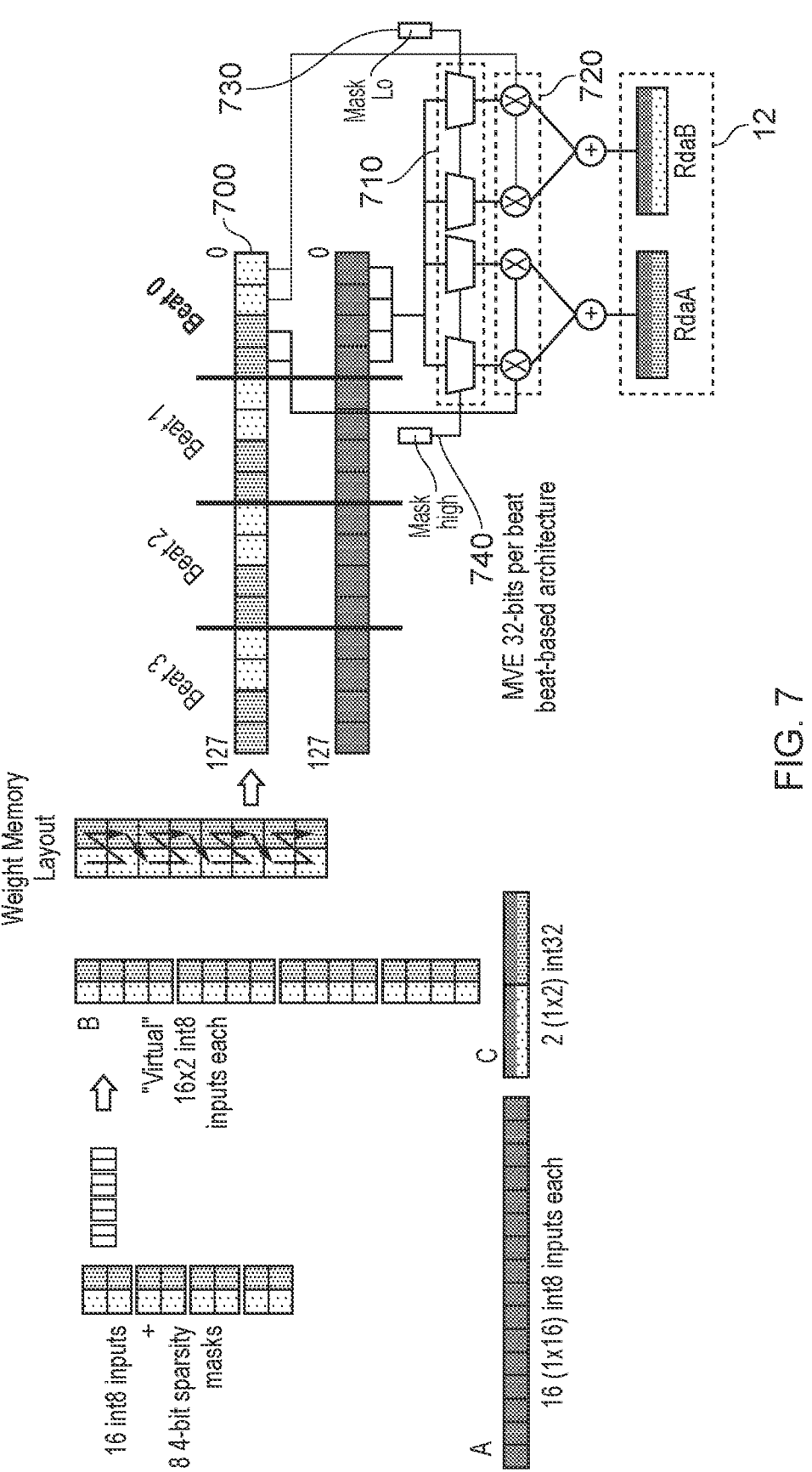
FIG. 7 illustrates a variant instruction in which the weights have different bit widths by virtue of compression.

FIG. 7 illustrates a variant instruction in which the weights have different bit widths by virtue of compression. Here, the instruction takes the form:

VMLADBBAV.S8 RdaA, RdaB, Qn, Qm, Q0, #<sel>

The parameters correspond with the previously illustrated instruction. 'Q0' stores the corresponding compression data in the form of sparsity masks or mux indexing. Meanwhile, 'sel' (which is an example of the claimed compression data selector) is an immediate value used to indicate which sparsity mask is taken from Q0. In particular, as will be shown with respect to FIGS. 13A-13D, Q0 is able to store compression data (e.g. sparsity masks) for multiple operations due the compression data being significantly smaller than the weights data. Because of this, the sel parameter is used to indicate which portion of the compression data is required for the current operation. The compression data can be stored in registers 730, 740 (e.g. one per channel to be decompressed per beat).

A matrix may be said to be sparse if a portion (e.g. half) of the values in the matrix are zero as opposed to non-zero. However, for the purposes of matrix multiplication, zero values have no effect. That is, the result of any multiplication by zero is always zero and there is no consequence of adding that result to a series of other multiplications (x+0=x). To some extent, therefore, the zero values in a matrix can be ignored provided the relative position of other values is correctly maintained. One way to compress a matrix, therefore, is to erase the zero values, compacting the remaining values together, and providing a sparsity mask to understand the true locations of the remaining values.

Thus, in the example of FIG. 7, input A again consists of 16 8-bit activations. Meanwhile, input B consists of 32 weights each of 8 bits-16 weights belonging to each of the two channels. These weights have, however, been compressed into 16 8-bit weights and 8 4-bit sparsity masks, which indicate how the compressed form is converted into the uncompressed form. In this example, a compression rate of 1.6× is achieved. That is, half of the entries in the input channels are zeros (2×), plus the overhead for the decompression sparsity mask. Consequently, the average number of bits used to express the activations is reduced because the number of bits used to express the zeros is zero (assuming the sparsity masks themselves are not included).

As in the example of FIG. 4A, a 'z' shaped scan is performed in order to interleave the weights of the two channels into a single striped form 700 (in other words, the model is placed into a second format). As in the case of FIG. 4A, each grouping is of 16 bits. That is, 16 bits are taken from the first channel, followed by 16 bits from the second channel, and then the next 16 bits are taken from the first channel and so on. Execution is again spread over four beats. In each beat, four weights (two from each of the channels) are multiplied by four activations. In practice, due to the compression rate, this is actually equivalent to four weights being multiplied by four activations where two of the weights are zeros (and therefore no multiplication need take place).

A series of multiplexers 710 are used to reposition the activations to compensate for the removed zero weights. This repositioning is achieved using the sparsity mask information and will be illustrated in more detail with respect to FIG. 8 and FIG. 9.

Once the positioning is determined, multiplications take place using multiplication circuitry 720 and the result is provided to a pair of scalar registers RdaA and RdaB as previously discussed.

Since the same set of activations is used for each set of multiplications, the number of load operations can be kept small. Indeed, in some situations, the ratio of load operation to computational operations can be kept at, or near, to 1:1—with one or more additional loads being required for the sparsity masks that indicate how the compression has been performed.

As for the previously described instruction, predicate generation can proceed in the usual manner provided either padding is performed (in a similar manner as FIG. 4B) or intra-beat reshaping has been performed (in a similar manner as FIG. 4C) prior to the weights being compressed in the pre-processor 110.

Figure 8:
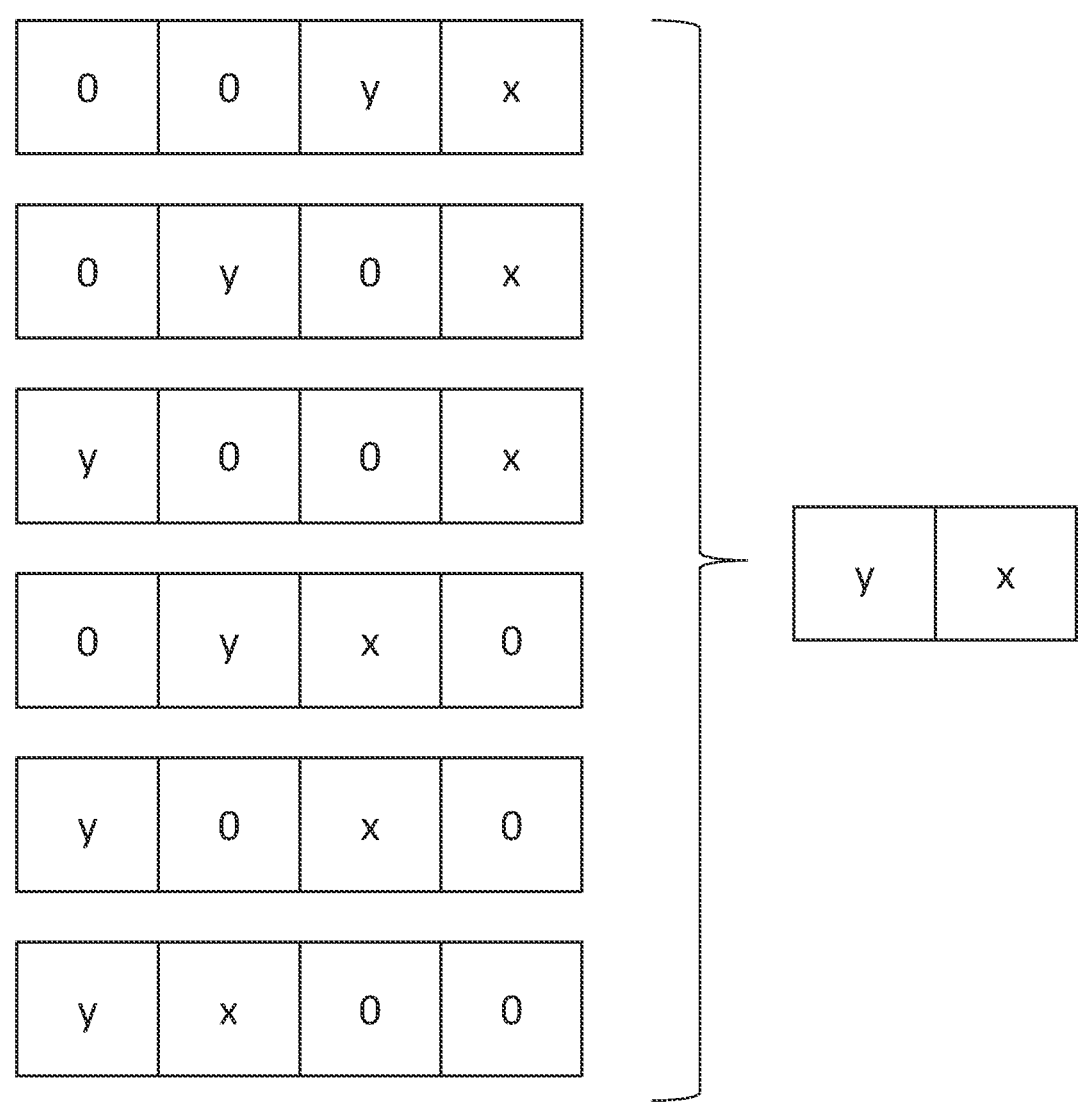
FIG. 8 illustrates how the compression of a matrix (or a vector) operates.

FIG. 8 illustrates how the compression of a matrix (or a vector) can operate. In this case, the values 'x' and 'y' are considered to be non-zero values. Thus, for any of the six different (1×4) matrices illustrated in FIG. 8, a single (1×2) matrix can be achieved through compression by removing the zero values.

The compression data can therefore take the form of a (sparsity) mask indicating an index of where the non-zeros are located. For instance, compression data 0010 might mean that the first non-zero is located at position 00 (i.e. 0) and the second non-zero is located at position 10 (i.e. 2). Assuming a right-to-left numbering scheme, this would therefore correspond with the second form shown in FIG. 8.

There are a number of other forms that the compression data can take. For instance, the data could be compressed as a <value><position> pair. For data of a particular (known) format, knowledge of the format can be used to perform further compression. For instance, if it is known that the first position will always be a zero then the compression data can be reduced to two bits to indicate where the second zero is located. Other techniques will be known to the skilled person.

Figure 9:
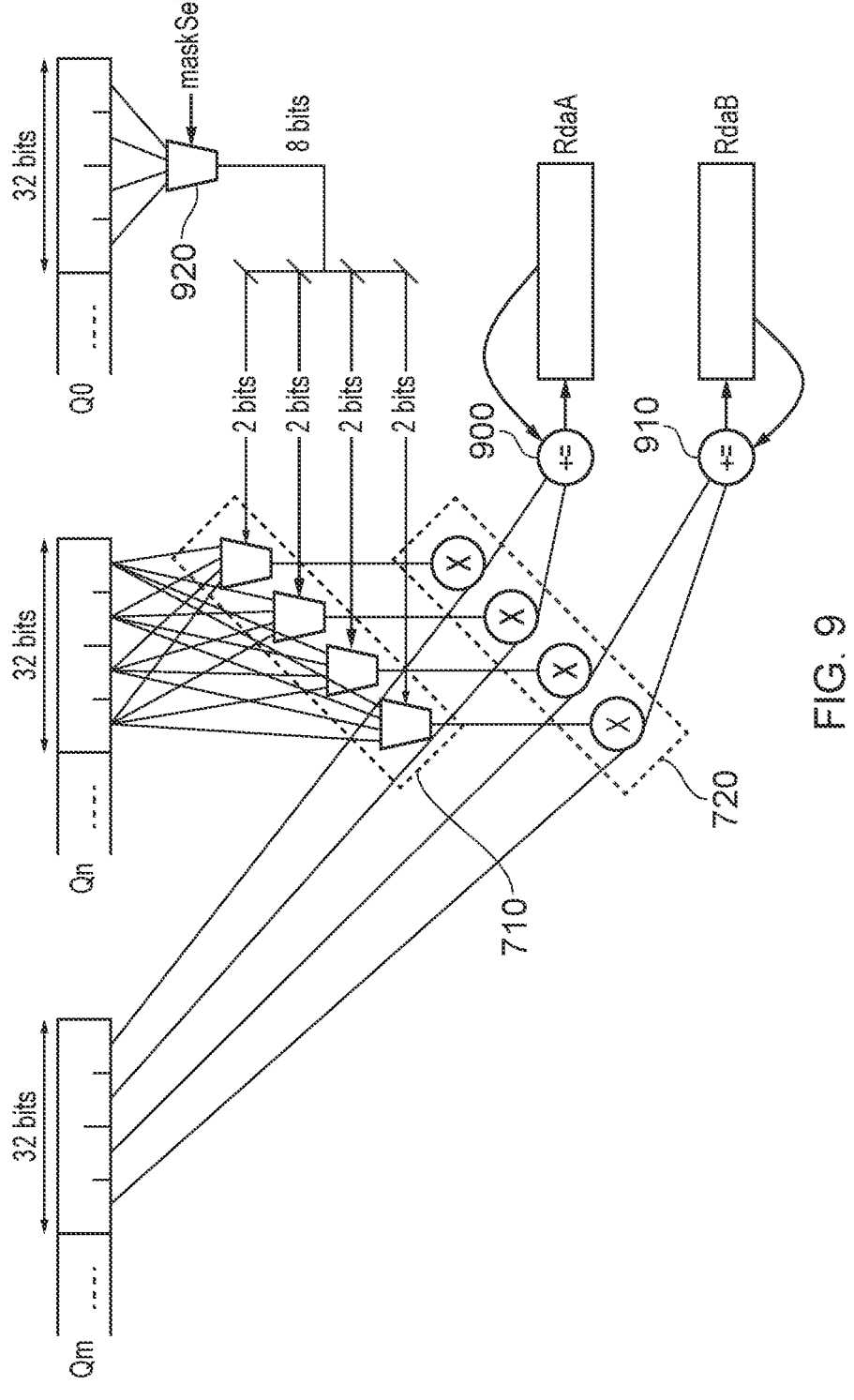
FIG. 9 shows the operation of the multiplexer circuitry in more detail.

FIG. 9 shows the operation of the multiplexer circuitry 710 in more detail. In this example, Qm contains the weights (which in this case have been compressed to remove zero values) and Qn contains the activations. Sparsity mask data is then included from register Q0 to indicate where the removed zeros should be located so that the remaining non-zero weights are multiplied by the correct activations. Recall also that the weights relate to two different channels. The first two weights belong to a first channel and the second two weights belong to a second channel. A multiplexer 920 is provided in order to select the sparsity masks that are relevant for the current beat (or sub-beat). That is to say that only 32 bits of register Q0, 8 bits per beat, are necessary in this example to store the sparsity information.

In this example, each of the multiplexers in the multiplexing circuitry 710 receives a 2-bit switching signal to indicate which of the activations from Qn (that are available within the current beat) should be taken. Activations that are not taken are activations that would be multiplied by a zero weight (which is revealed by the sparsity masks). The eight bit sparsity mask is therefore split into four lots of two bits, with each lot of two bits acting as the switching signal to one of the multiplexers to determine which activation it should receive. Since the sparsity mask might be different for each of the two channels, it is possible for completely different values to be provided to each multiplexer.

As before, the results of the multiplications are added together by adders 900, 910 and stored in scalar registers RdaA, RdaB.

FIG. 10 shows an example in which a set of weights (y, 0, x, 0) belonging to a a first channel are multiplied by a set of activations (a, b, c, d). In theory, the multiplication that takes place is (ya)+(0b)+(xc)+(0d). Hence, this is equivalent to ya+xc. In another example, a second model has the set of weights (0, y, x, 0) belonging to a first model and these are multiplied by the same set of activations (a, b, c, d). Here, the multiplication that would take place is (0a)+(yb)+(xc)+(0d). This is equivalent to yb+xc. Therefore, any four of the activations could be taken for any one channel, but only two of them will be taken per channel. The sparsity masks are used to indicate which activations are taken for each channel.

Figure 11:
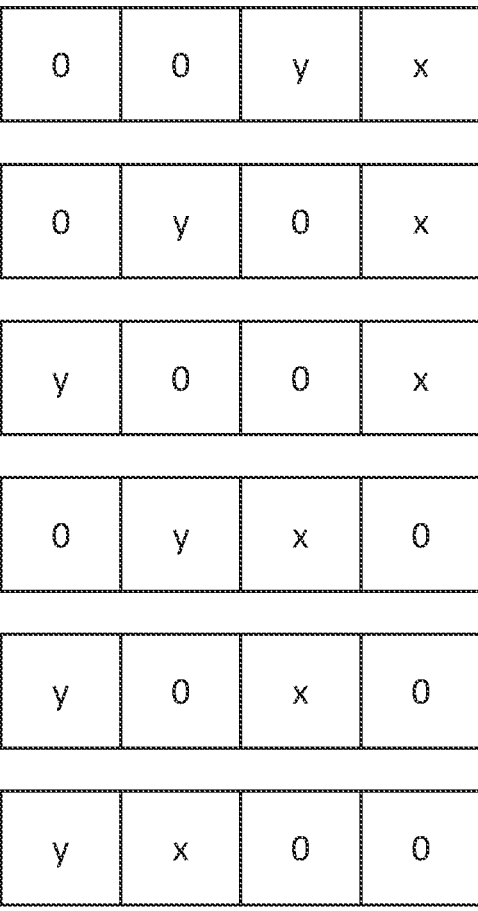
FIG. 11 shows the different combinations that are possible for the multiplexer inputs.

It will be appreciated that although 4-to-1 multiplexers are illustrated in FIG. 9, that such complexity is not required. This is because not every permutation of activations is possible in every instance. For example, FIG. 11 shows the different combinations that are possible. Note that there are only three locations that the weight 'x' can occupy and there are only three positions that the weight 'y' can occupy. This is because if the weight 'x' were placed in the fourth (leftmost) position in FIG. 11, there would be no space for the weight 'x' to be placed (the order of the weights is preserved). Similarly, if the weight 'y' were placed in the rightmost position, there would be no space for the weight 'x' to occupy if the ordering of weights was to be maintained as presented in the compressed data.

In general, when there are n positions for the uncompressed weights and when there are m non-zero weights then there are n+1−m positions into which each weight can go, and therefore an (n+1−m) to 1 multiplexer is needed for each position.

Figure 12:
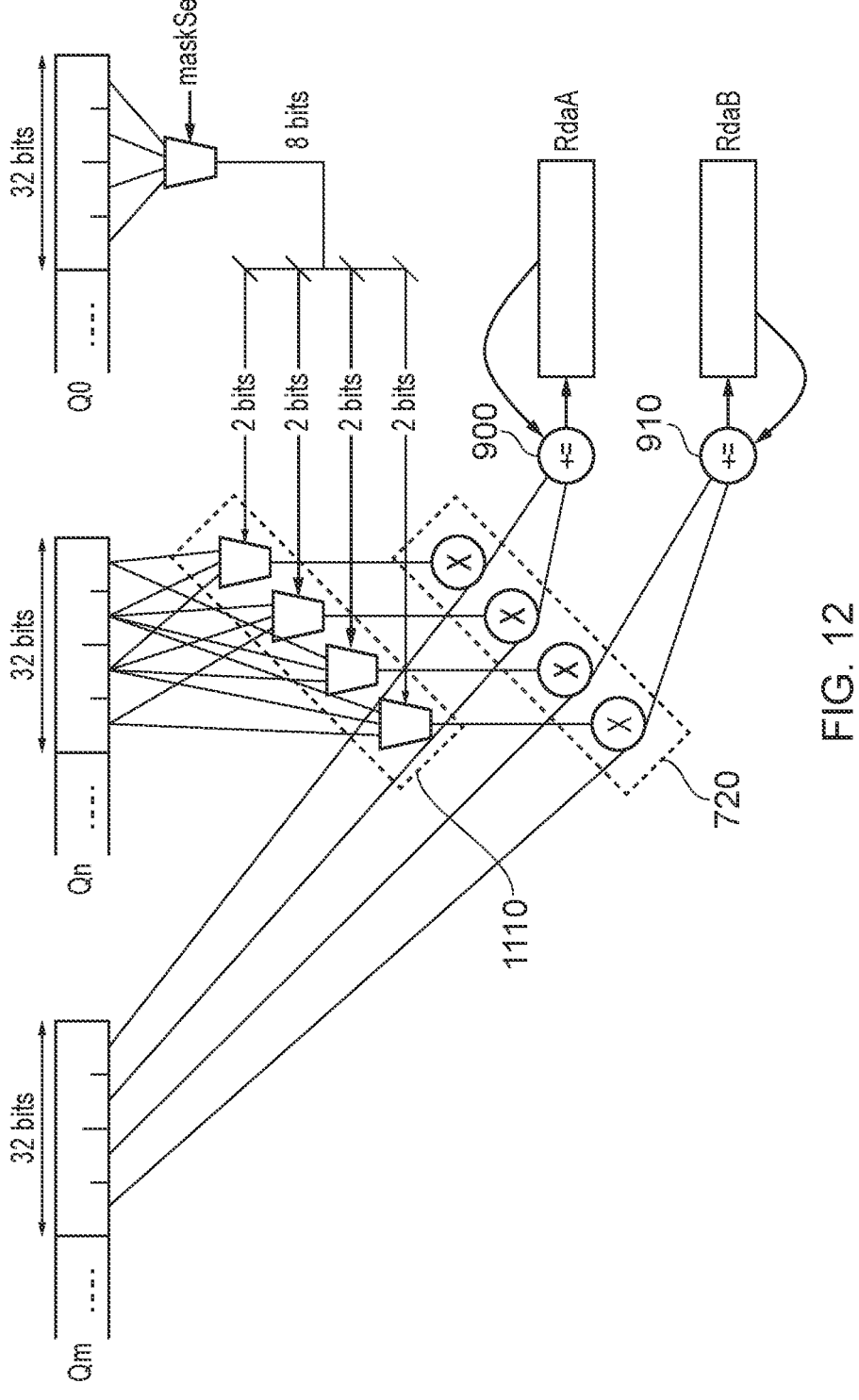
FIG. 12 shows an arrangement in which 3-to-1 multiplexers are used.

FIG. 12 therefore shows an arrangement in which 3-to-1 multiplexers are used in the multiplexer circuitry 1100.

It will be appreciated that the amount of storage required for the compression data is likely to be significantly smaller than the amount of data required for the weights. For instance, when using sparsity mask data, four fields of 1-bit each can be used to represent the positions of non-zeros in an unpacked set of four weights. If those weights are each 8-bit, then a total of four bits of positional encoding plus 16 bits (2×8 bits, assuming 50% sparsity) of weight values decompress to 32 bits of data-a compression ratio of 32:20, or 1.6:1.

In practice, within a memory system, each of the masks for a given channel may be provided one at a time. That is, if there are four channels of N weights each, then the masks associated with the N weights of the first channel may be stored before the N weights of the second channel and then the N weights of the third channel, followed by N weights of the fourth channel. In practice, loading the compression data in such a format for a matrix multiplication would require either multiple registers to store data belonging to multiple channels or would require the mask data for different channels to be repeatedly loaded into a single register.

Figure 13A:
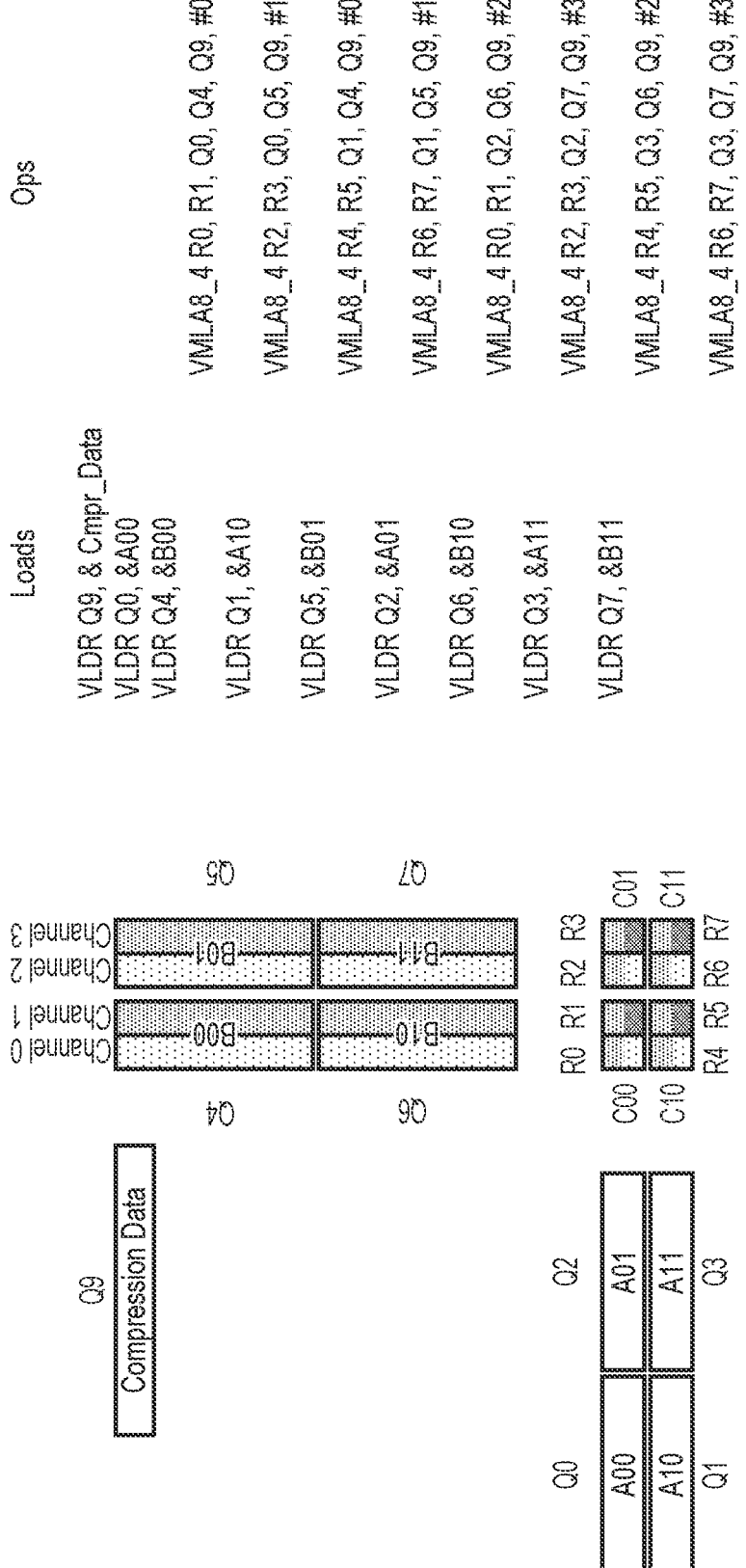
FIG. 13A shows how matrix multiplication may be performed in a situation having four channels.

For instance, FIG. 13A illustrates the ordering of loads and computational operations that take place in a matrix multiplication. Here, the term Axx is used to refer to a vector register that stores activations and the term Byy is used to refer to a vector register that stores weights. Recall that by having reduced the size of a weight (e.g. from 8 bits to 4 bits) each vector register that stores weights is able to store two channels worth of weights. Czz therefore refers to a pair of scalar registers (e.g. RdaA and RdaB) that each store a result of multiplying the activations of one activation register by the weights belonging to one channel in one vector register that stores weights.

FIG. 13A illustrates the order in which weights and activations are loaded into the relevant registers. In addition, FIG. 13A shows the order in which the multiplications occur With the ordering shown in FIG. 13A, operations are completed for a set of weights on a pair of channels (e.g. as shown in FIG. 7), before moving to a next set of weights on the adjacent pair of channels for a total of 4 channels being processed. That is, each of the operations is performed for the weights in the four channels held in B00 and B01 before operating on the next set of weights further down the four channels held in B10 and B11. Likewise, A00 and A10 are consumed before advancing further across the activation vectors to A01 and A11. This will continue to B20, B21 and A02, A12 (not shown), etc., until the entirety of the vectors of n elements have been processed.

Previously described FIG. 7 illustrates the behaviour of one of these operations, e.g. the multiplication of A00 in register Q0 by B00 in register Q4.

It will be appreciated that if the sparsity data for all of the weights of two channels were stored in a single register then this would either require two registers to store all the mask data for four channels, or it would require a single register into which the mask data was repeatedly loaded and unloaded between the 2 pairs of channels. For instance, after each operation, the mask data relating to the other two channels would need to be loaded.

Note that in these examples, no selection register is required. Instead, an immediate 'sel' value is passed in via each instruction to indicate which portion of the compression data is required for the instruction. As will be explored with respect to FIGS. 14A and 14B the explicit specification of this immediate value can be foregone since there is a 1-to-1 mapping between one of the source registers (that holding the compressed matrix data) and the immediate value.

Figure 13B:
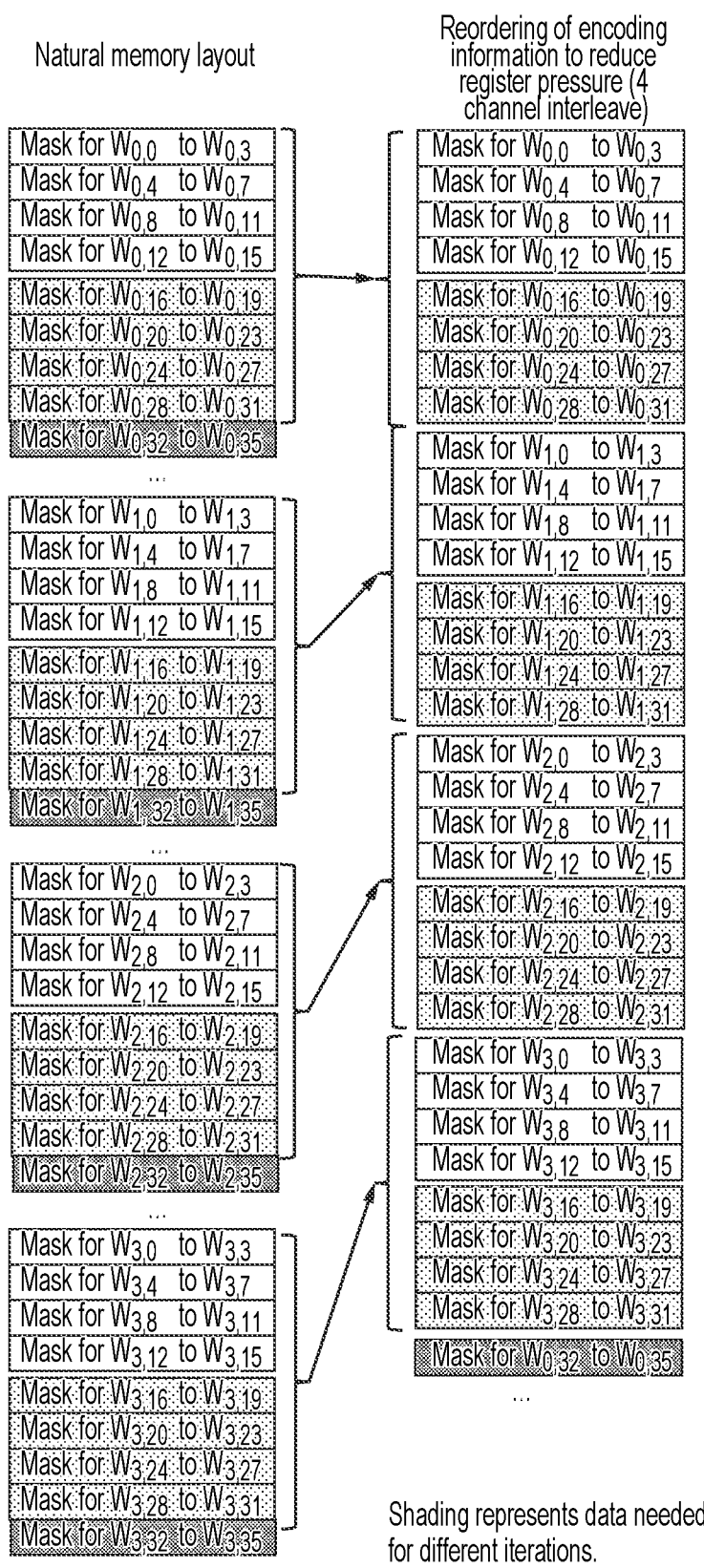
FIG. 13B shows how compression data, in the form of sparsity masks, may be rearranged.

FIG. 13B illustrates how the natural memory layout of masks can be reordered by a pre-processor 100 so as to relieve register pressure. Here it is assumed that each channel contains 64 weights w and that there are four channels. The term $W_{i,j}$ refers to the j'th weight of channel i. In this case, the masks are reordered by the pre-processor 100 so that masks for the first 32 weights of each of the four channels are stored before the next 32 weights of each of the four channels are stored. In other words, the masks are reordered so as to store as many weights (of an equal number) from each channel as possible in a vector register 14 of the processor 2.

Consequently, using one of the vector registers 14 to store the sparsity mask data, a reload of the mask data is needed after performing eight of the operations shown in FIG. 13A. That is, until mask data is needed for register B20.

Note that as an alternative, a single vector register could store all 64 weights from two channels. However, as illustrated in FIG. 13A, the second operation, which handles channels 3 and 4, would require the mask data for the third and fourth channels to be loaded, then the third operation would require the mask data for the first and second channels to be loaded, then the fourth operation would again require the mask data for the third and fourth channels to be loaded and so on. Thus, either one or more extra vector registers would be needed, or superfluous load operations would be performed. The reordering illustrated in FIG. 13B prevents this from happening.

Figure 13C:
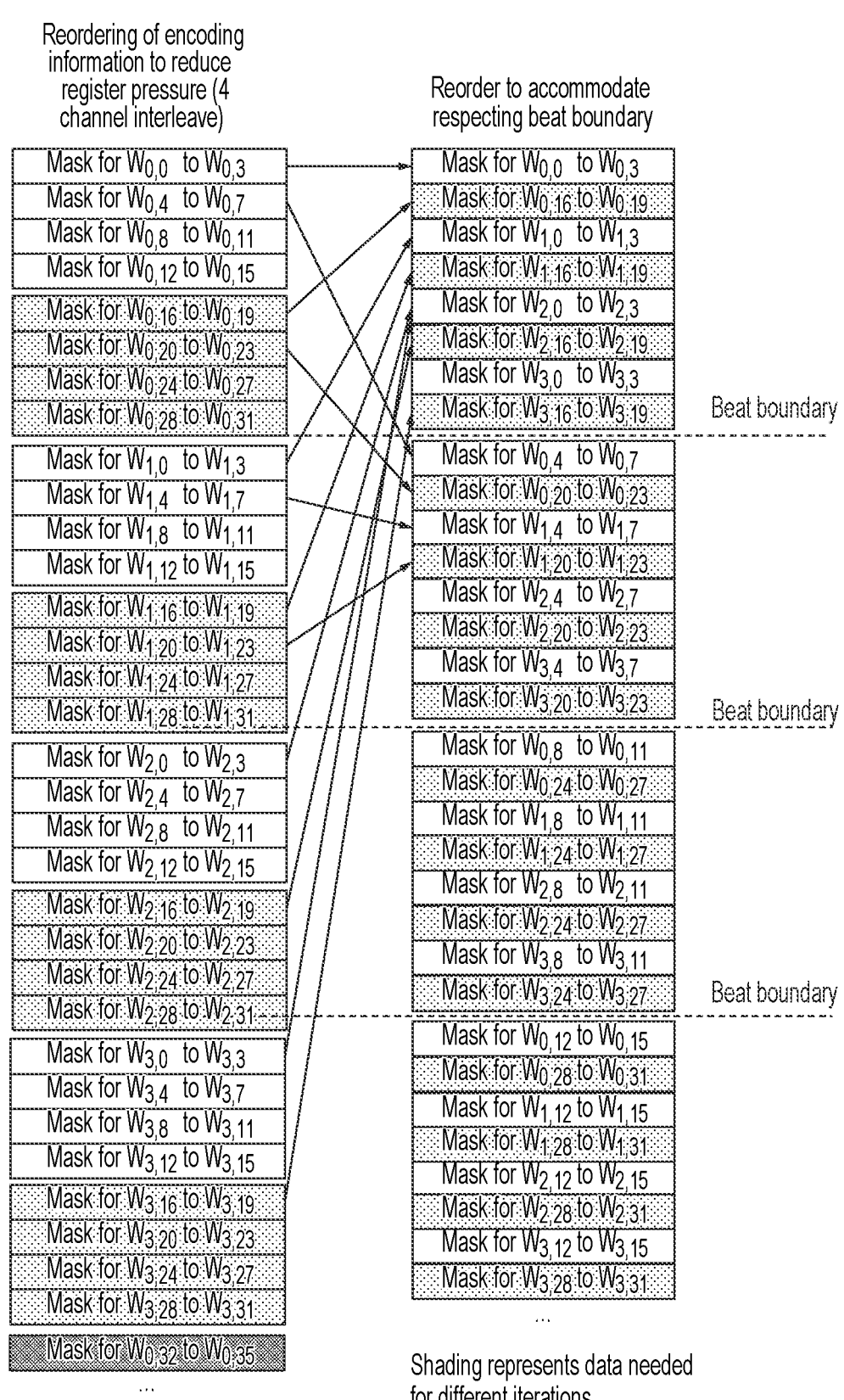
FIG. 13C shows a further manner in which the compression data can be rearranged.

FIG. 13C shows a further reordering that can be performed after the reordering performed in FIG. 13B. Here, the masks within the register are reordered based on which beat they will be used in. That is, the masks that are used in beat 0 are grouped together, followed by the masks that are used in beat 1, followed by the masks that are used in beat 2, and so on. The grouping can consider a number of operations. For instance, the masks presented in the first beat boundary are the masks that are needed for the weights used in the first beat of each of the first eight operations of FIG. 13A. Similarly, the masks presented in the second beat boundary are the masks that are needed for the weights used in the second beat of each of the first eight operations of FIG. 13A.

Figure 13D:
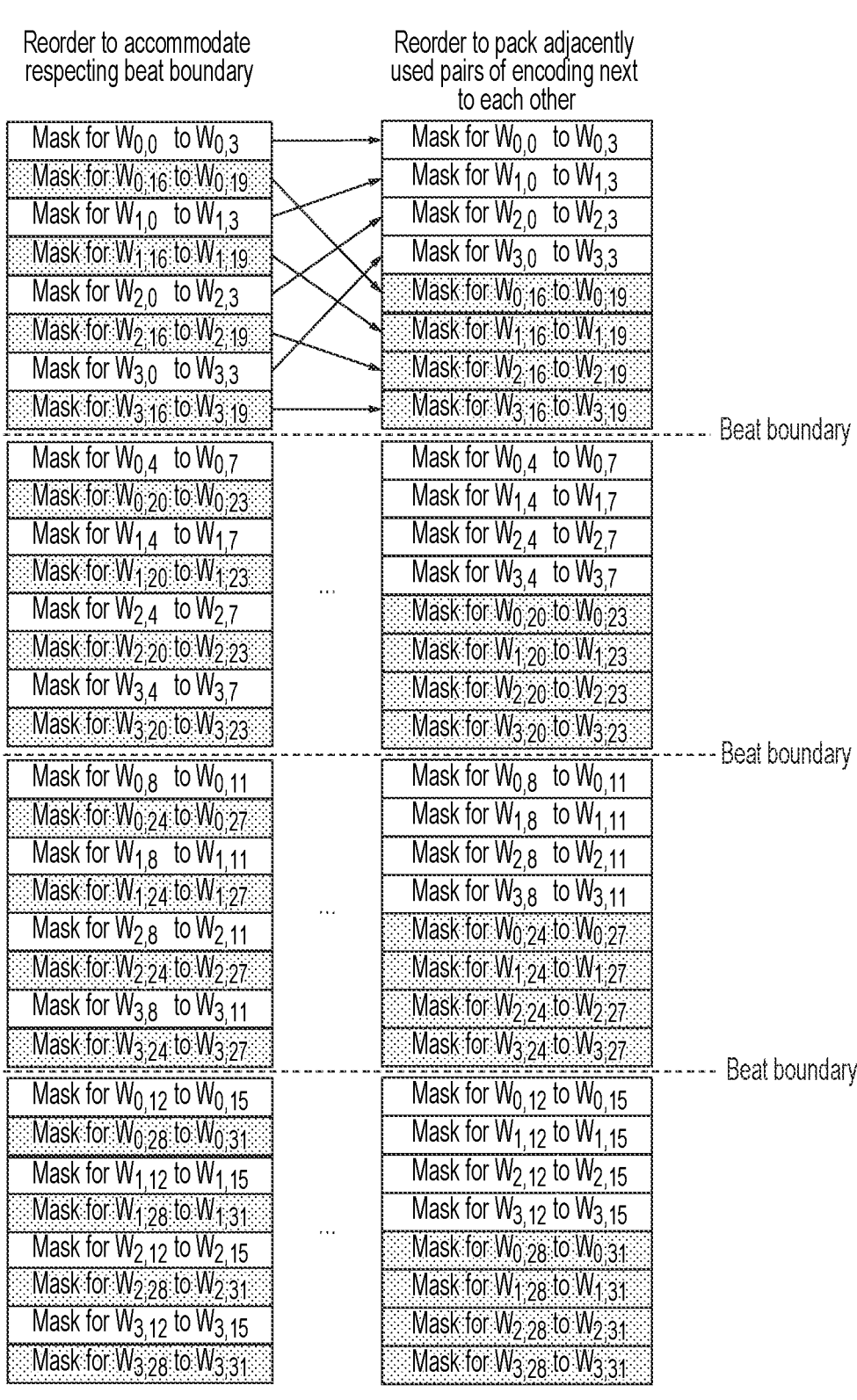
FIG. 13D shows a still further manner in which the compression data can be rearranged.

FIG. 13D shows a still further reordering that can be performed after the reordering performed in FIG. 13B or FIG. 13C. The reordering performed in FIG. 13D is analogous to the reordering performed in FIG. 4C. In particular, masks within each beat boundary are paired together so that a single 8-bit fetch can be made (of two masks) that is relevant to all of the weights handled within a single beat of a single operation. Thus, in FIG. 13D, the masks are ordered by weight index followed by channel number (within each beat). As shown in FIG. 7, the first beat of a first operation would require the mask for weights $W_{0,0}$ to $W_{0,4}$ (i.e. the first two elements of the first weights column in FIG. 7) and $W_{1,0}$ to $W_{1,4}$ (i.e. the first two elements of the second weights column in FIG. 7). The remaining elements in the first beat are therefore reserved for other operations. In the second beat of the first operation, the mask for weights $W_{0,4}$ to $W_{0,7}$ (i.e. the third and fourth elements of the first weights column in FIG. 7) and $W_{1,4}$ to $W_{1,7}$ (i.e. the third and fourth elements of the second weights column in FIG. 7) would be required. The sel parameter, shown earlier, can be used to indicate which masks within the register are used for a particular operation. Since the sel parameter indicates the masks that are needed and since the masks that are needed depend on the weights that are being used, the same sel parameter will be used for each weights register. Indeed, the register numbers shown for register B in FIG. 13A can directly translate to the sel number. The index of the required masks would therefore be:

$$<\text{beat number}> \times 8 + <sel> \times 2 \text{ and}$$

$$\left(<\text{beat number}> \times 8 + <sel> \times 2\right) + 1$$

Note that the above figures illustrate an example of compression in which a sparsity mask in the form of a bitfield is used to indicate the locations of non-zero values throughout the matrix. Other forms of sparsity masks or compression can also be used. For instance, one might store the non-zero values and an index of where, within a block, those non-zero values are positioned. So the value '000110' '11' might mean that the value 6 belongs to position 3.

It will also be appreciated that although FIGS. 13A-13D show a number of distinct steps for the rearrangement of the compression data/sparsity mask data, it is possible for all of these steps to be carried out in one single rearrangement operation or for only a subset of the steps to be carried out.

Figure 14A:
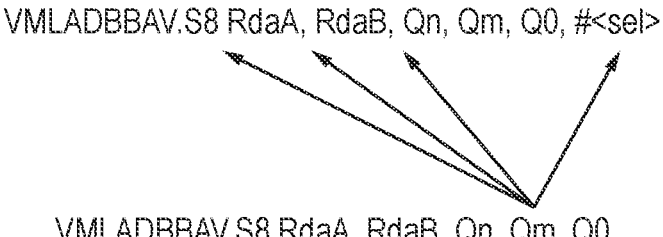
FIGS. 14A and 14B show how opcode space can be saved in, for instance, a matrix multiplication instruction.
Figure 14B:
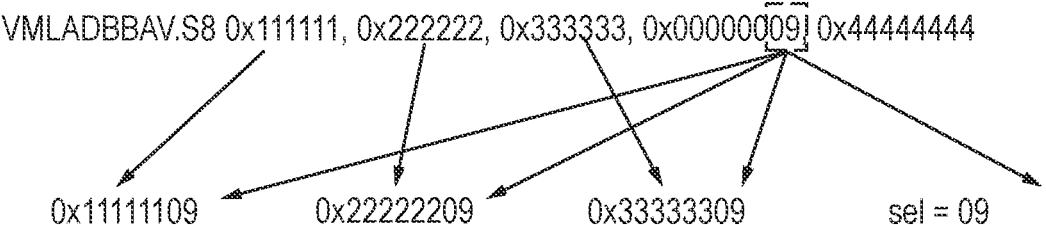

FIG. 14A illustrates a technique that can be used for decreasing the number of bits required to encode an instruction such as a matrix multiplication instruction. The technique is applicable to other forms of instruction as well. In this example, least significant bits of the address of one of the source registers (e.g. the register used to store the weights) are used to determine the address of the other source register, the destination register, and the sel value. In the example of FIG. 14B, the least significant bits are 09 (in hexadecimal). These bits are then combined with a stub address, which are bits provided for the destination register (0x111111), to form the full address of a first destination register (0x11111109). Similarly, the bits of a second destination register (0x222222) form a second stub address and this is combined with the least significant bits 09 to form the full address of the second destination register (0x22222209). Similarly, bits provided for the other source register (0x333333) forms a third stub address, which is combined with the least significant bits 09 to form the full address of the other source register—e.g. the one holding the activations (0x33333309). Finally, the bits 09 directly correspond with the sel value.

In this example, 8 bits are expressed in the encoding of each of the two source registers, destination register, and sel value for a total of 24 bits saved (32 bits expressed using only 8 bits, 32−8=24 bits saved). Other encoding schemes may save differing numbers of bits. This technique assumes that the relationship between the offset from a base source register and the other source register and the destination registers is the same. Note that in different embodiments, this technique may be used for arbitrary combinations of the source register, destination registers and sel value. In different embodiments, the bits that are used could originate from any of these different registers. For instance, bits of one of the destination registers could be used to determine the address of the other destination register, the source registers and the sel value. In other embodiments, the base value of certain types of register could be hard coded and a single offset could be provided for some or each of the destination registers, and source registers, and also used as the sel value.

Note that in the above examples, the load width may be larger than the processor width. That is to say that the registers might be larger than the number of bits that can be processed across all of the beats. In these situations, it is possible to load the vector registers with the values relating to two adjacent matrix multiplication instructions. The matrix multiplication instructions can then be directed towards either the top half of the bits or the bottom half of the bits, as appropriate.

Another optimisation is the implicit use of particular registers. For instance, in the example of FIG. 7, the register RO was specified as part of the instruction. In practice, of course, the register used to store the sparsity mask could be fixed, thereby reducing the number of bits required for encoding the instruction.

FIG. 15 shows a flowchart 1600 that illustrates an example of the present technique, particularly associated with the data processing apparatus 2. Here, at step 1610, a matrix multiplication instruction is received. This refers to a set of first elements (e.g. activations) in a first vector register and a set of second elements (e.g. weights) in a second vector register. The first and second vector registers are such that they can be temporally and spatially divided dynamically (as required). Then, at a step 1620, a matrix multiplication operation is generated that causes execution units to perform a multiplication of the first elements by the second elements. The first elements and the second elements have a different bit-width to each other.

Figure 16:
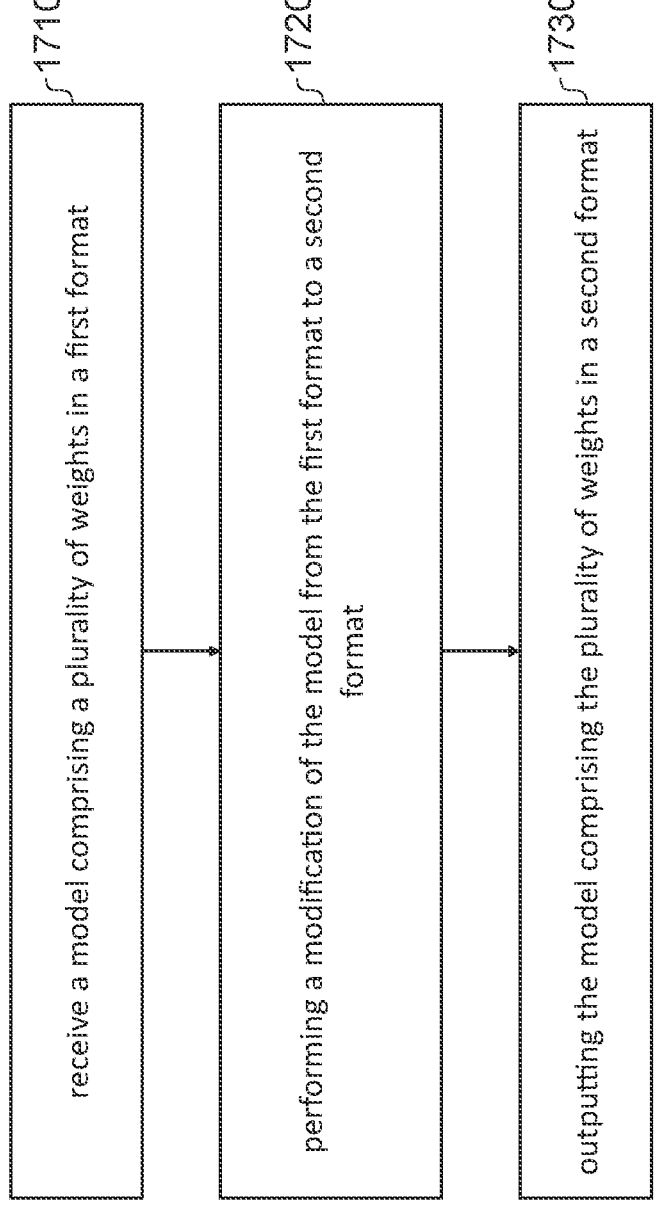
FIG. 16 shows a flowchart that illustrates the present technique as may be applied by a pre-processor.

FIG. 16 shows a flowchart 1700 that illustrates the present technique as may be applied by a pre-processor 100. At a step 1710, a model is received that contains a plurality of weights in a first format. At a step 1720, the model is modified from being in the first format to a second format. At a step 1730, the model containing the weights in the second format is output. The second format is computationally contiguous in respect of a data processing apparatus 2 having first vector registers 14A and second vector registers 14B, both configured to be dynamically spatially and dynamically temporally divided, performing a matrix multiplication using the model.

Figure 17A:
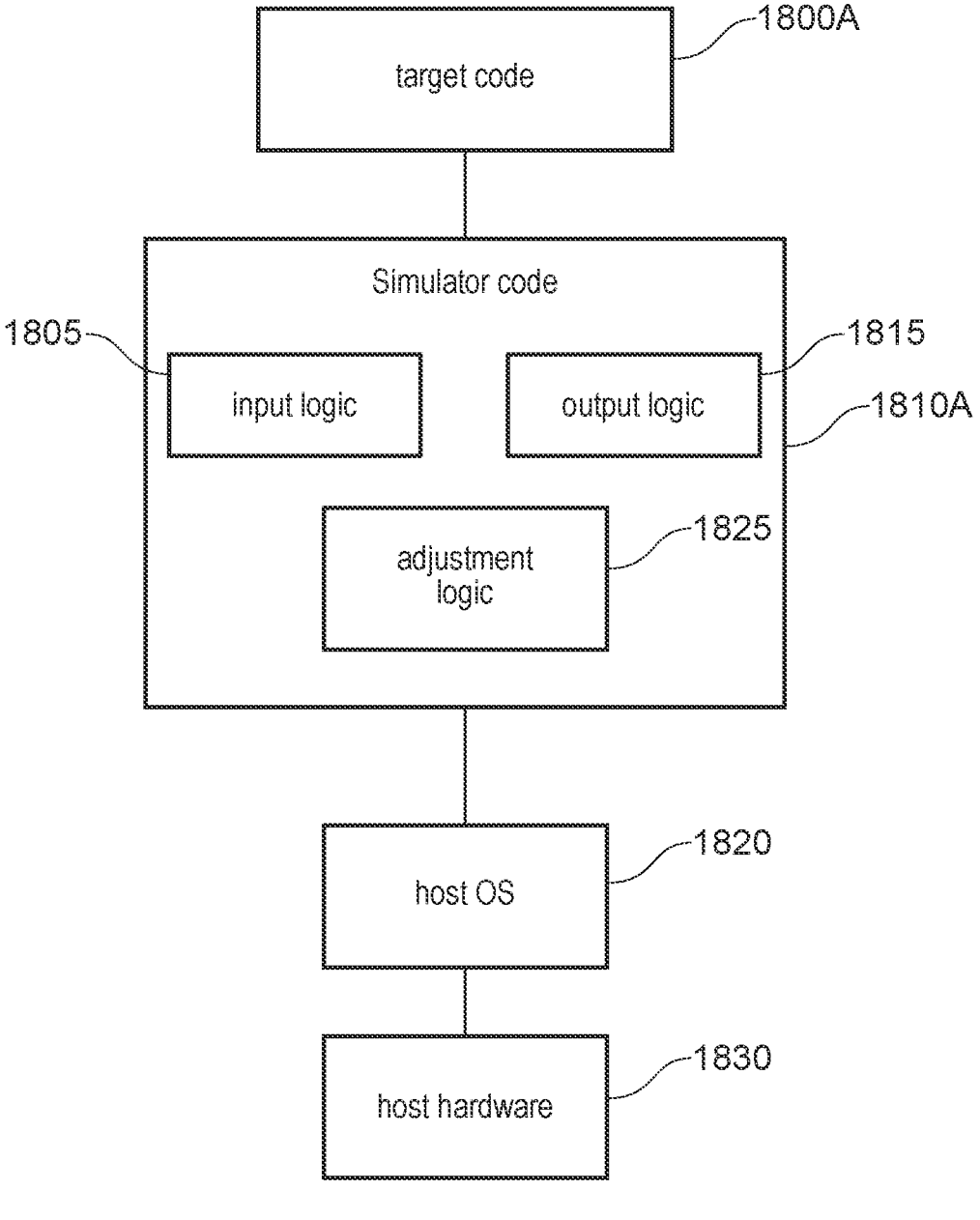
FIGS. 17A and 17B illustrate simulator implementations that may be used.
Figure 17B:
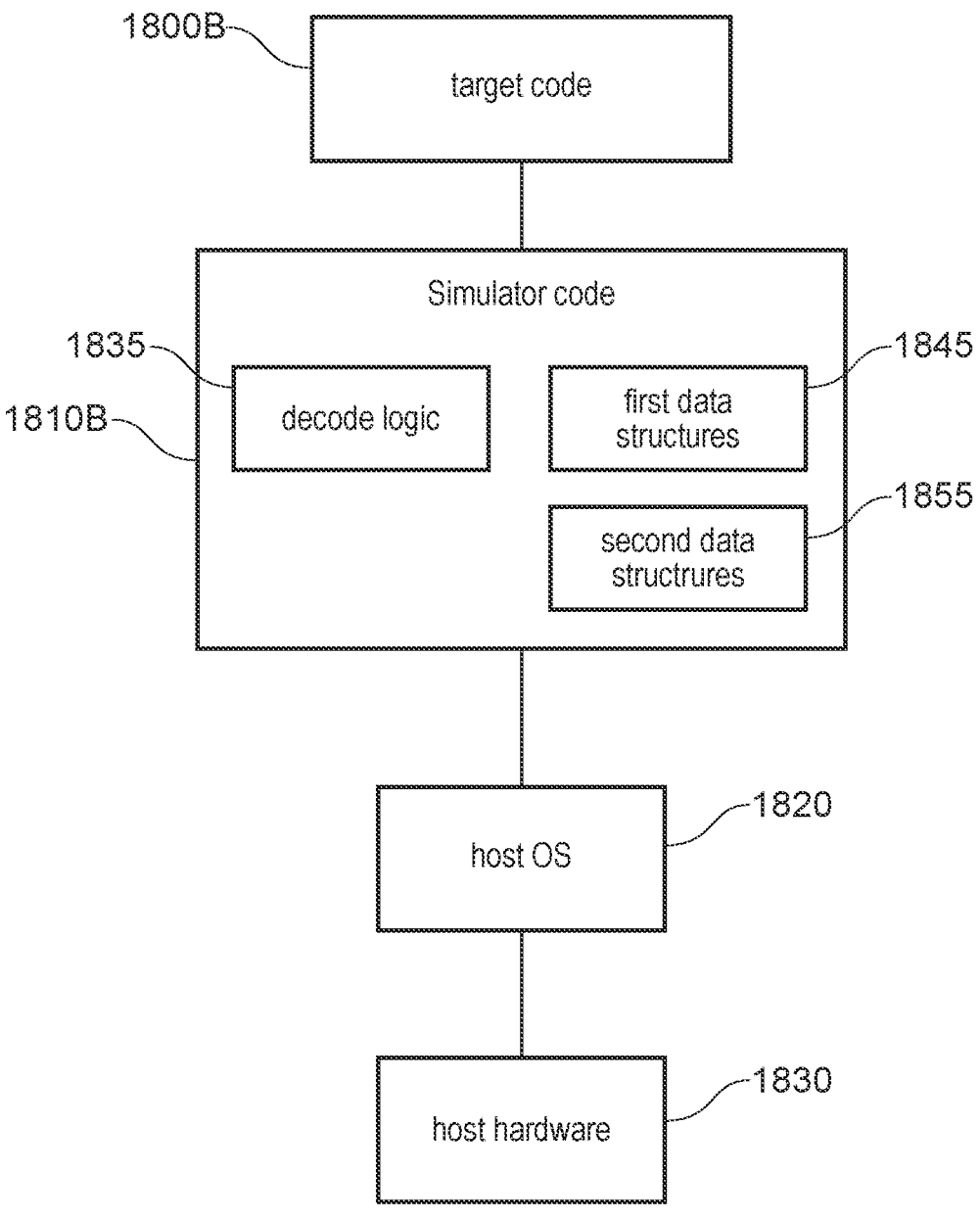

FIGS. 17A and 17B illustrate simulator implementations that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1830, optionally running a host operating system 1820, supporting the simulator program 1810A, 1810B. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1830), some simulated embodiments may make use of the host hardware, where suitable.

The simulator programs 1810A and 1810B may be stored on a computer-readable storage medium (which may be a non-transitory medium), and provides a program interface (instruction execution environment) to the target code 1800 (which may include applications, operating systems and a hypervisor) which is the same as the interface of the hardware architecture being modelled by the simulator program 1810. Thus, the program instructions of the target code 1800 may be executed from within the instruction execution environment using the simulator program 1810, so that a host computer 1830 which does not actually have the hardware features of the apparatuses discussed above can emulate these features.

The simulator program 1810A corresponds with the pre-processor apparatus 100 previously discussed and includes input logic 1805 whose behaviour corresponds with the behaviour of the input circuitry 120. Output logic 1815 is provided, whose behaviour corresponds with the behaviour of the output circuitry 140 and adjustment logic 1825 is provided whose behaviour corresponds with the behaviour of the adjustment circuitry 140.

The simulator program 1810B corresponds with the data processing apparatus 2 previously discussed and includes decode logic 1835 whose behaviour corresponds with the behaviour of the decode circuitry 6. First data structures 1845 are provided that correspond with the first bank 14A of vector registers and second data structures 1855 are provided that correspond with the second bank 14B of vector registers.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The present technique may be configured in accordance with the following clauses:

1. A data processing apparatus comprising:
   first vector registers and second vector registers, both configured to be dynamically spatially and dynamically temporally divided; and
   decode circuitry configured to receive one or more matrix multiplication instructions comprising an indication of a set of first elements in the first vector registers and a set of second elements in the second vector registers, and in response to receiving the matrix multiplication instructions to generate a matrix multiplication operation, wherein
   the matrix multiplication operation is configured to cause one or more execution units to perform a matrix multiplication of the set of first elements by the set of second elements; and
   an average bit width of the first elements is different to an average bit width of the second elements.

2. The data processing apparatus according to clause 1, wherein
   the first elements comprise a single row of n activations and the second elements comprise a pair of columns, each comprising n weights; and
   the matrix multiplication instructions comprise an indication of a result register configured to store a first set of bits of a result of the matrix multiplication and a second set of bits of the result of the matrix multiplication.

3. The data processing apparatus according to clause 2, wherein
   the matrix multiplication instructions comprise an indication of a further result register;
   the result register is configured to store the first set of bits of the result of the matrix multiplication; and
   the further result register is configured to store the second set of bits of the result of the matrix multiplication.

4. The data processing apparatus according to any preceding clause, wherein
   the matrix multiplication multiplies fewer rows of the first set of elements than a number of columns of the second set of elements.

5. The data processing apparatus according to any preceding claim, wherein
   the matrix multiplication is of one row of the first set of elements and two columns of the second set of elements.

6. The data processing apparatus according to any preceding clause, wherein
   the matrix multiplication instructions comprise an uncompressed matrix multiplication instruction;
   the first elements comprise a single group of n activations;
   the second elements comprise m groups of n weights, where m>1; and
   a bit width of the second elements is 1/m times a bit width of the first elements.

7. The data processing apparatus according to any preceding clause, wherein
   the bit width of the second elements is four bits or less.

8. The data processing apparatus according to any preceding clause, wherein
   the bit width of the second elements is one bit.

9. The data processing apparatus according to any preceding clause, wherein
   the second elements are signed.

10. The data processing apparatus according to any preceding clause, wherein
   the weights are extended prior to the matrix multiplication.

11. The data processing apparatus according to any one of clauses 8-10, wherein
   the one or more matrix multiplication instructions comprise an indicator value, or the data processing apparatus comprises a selection register configured to store the indicator value; and
   the indicator value is configured to indicate a subset of the weights that are used in the matrix multiplication during a particular beat of the data processing apparatus.

12. The data processing apparatus according to any one of clauses 8-10, wherein
    bits of at least one of the indication of the set of first elements in the first vector registers and the set of second elements in the second vector registers are used to indicate a subset of the weights that are used in the matrix multiplication during a particular beat of the data processing apparatus.

13. The data processing apparatus according to any preceding clause, wherein
    the matrix multiplication instructions comprise a compressed matrix multiplication instruction that comprises an indication of compression data;
    the first elements comprise a single row of n activations;
    the second elements comprise m groups of n compressed weights, where m>1;
    the compression data indicates how the n compressed weights are decompressed to form mn uncompressed weights.

14. The data processing apparatus according to clause 13, wherein
    the compression data comprises a plurality of portions, each applicable to one of a plurality of matrix multiplication instructions including the compressed matrix multiplication instruction; and
    the compressed matrix multiplication instruction comprises a compression data selector configured to select one of the portions of the compression data to be applied to form the n uncompressed weights.

15. The data processing apparatus according to clause 14, wherein
    the compression data is applicable to a plurality of the matrix multiplication instructions;
    at least some of the matrix multiplication instructions indicate different second elements from each other; and
    the compression data comprises a number of items.

16. The data processing apparatus according to clause 15, wherein
    the compression data is applicable to more than m groups of n weights.

17. The data processing apparatus according to any one of claims 15-16, wherein
    the items are ordered in the compression data according to a beat in which they are used within the plurality of matrix multiplication operations.

18. The data processing apparatus according to any one of clauses 15-17, wherein
    the items are ordered in the compression data such that items used in a same beat of a same single matrix multiplication operation are adjacent.

19. The data processing apparatus according to any one of clauses 14-18, wherein
    the compression data selector is least significant bits of another parameter of the compressed matrix multiplication instruction.

20. The data processing apparatus according to any one of clauses 14-19, wherein
    the compression data selector is least significant bits of an address of the second elements.

21. The data processing apparatus according to clause 20, wherein
    the compression data selector is combinable with a stub address of the first elements to form an address of the first elements; and the compression data selector is combinable with a stub address of a result register to form an address of result register into which at least a part of the result of the matrix multiplication is stored.

22. The data processing apparatus according to any one of clauses 14-21, comprising:
    multiplexer circuitry configured to select from between the activations to match with the uncompressed weights that are non-zero to provide as an input to the matrix multiplication.

23. The data processing apparatus according to clause 22, wherein
    the multiplexer circuitry is configured to select from between a subset of the activations to match with the uncompressed weights that are non-zero.

24. A data processing method comprising:
    receiving one or more matrix multiplication instructions comprising an indication of a set of first elements in first vector registers and a set of second elements in second vector registers, wherein each of the first vector registers and second vector registers are configured to be dynamically spatially and dynamically temporally divided;
    in response to receiving the matrix multiplication instructions, generating a matrix multiplication operation, wherein
    the matrix multiplication operation causes one or more execution units to perform a matrix multiplication of the set of first elements by the set of second elements; and
    an average bit width of the first elements is different to an average bit width of the second elements.

25. A computer program for controlling a host data processing apparatus to provide an instruction execution environment comprising:
    first data structures and second data structures, both configured to be dynamically spatially and dynamically temporally divided; and
    decode logic configured to receive one or more matrix multiplication instructions comprising an indication of a set of first elements in the first data structures and a set of second elements in the second data structures, and in response to receiving the matrix multiplication instructions to generate a matrix multiplication operation, wherein
    the matrix multiplication operation is configured to cause execution logic to perform a matrix multiplication of the set of first elements by the set of second elements; and
    an average bit width of the first elements is different to an average bit width of the second elements.

26. A data processing apparatus comprising:
    input circuitry configured to receive a matrix in a first format comprising a plurality of values;
    output circuitry configured to output the matrix comprising the plurality of values in a second format; and
    adjustment circuitry configured to perform a modification of the matrix from the first format to the second format, wherein
    the second format is computationally contiguous in respect of a data processing apparatus having first vector registers and second vector registers, both configured to be dynamically spatially and dynamically temporally divided, performing a matrix multiplication using the matrix.

27. The data processing apparatus according to clause 26, wherein the values comprise a first set and a second set, each of which are to be multiplied by a single set of activations in the matrix multiplication;

in the first format, the first set forms a first contiguous grouping and the second set forms a second contiguous grouping; and the adjustment circuitry is configured to interleave the values of each of the first set and the second set to produce the second format by performing a 'z' shaped scan over the first set and second set.

28. The data processing apparatus according to clause 26, wherein the first set and the second set are interleaved in blocks of size p in the second format; and p is equal to a number of the activations that are multiplied simultaneously in the matrix multiplication, where p>1.

29. The data processing apparatus according to clause 26, wherein the adjustment circuitry is configured to interleave the first set and the second set into blocks of size p by performing a two-layer interleaving in which the 'z' shaped scan is performed p times over the first set and the second set.

30. The data processing apparatus according to any one of clauses 26-29, wherein in the second format, within a contiguous q blocks of size p, the values are grouped according to their position within the first set and the second set.

31. The data processing apparatus according to any one of clauses 26-30, wherein each weight has an index j within a set i; and in the second format, within each q blocks of size p, the values are ordered firstly according to their index j and secondly according to their set i.

32. The data processing apparatus according to any one of clauses 26-31, wherein the adjustment circuitry is configured to perform the modification in a single stage.

33. The data processing apparatus according to any one of clauses 26-32, wherein the values comprise compressed weights;

the output circuitry is configured to output compression data; and the compression data comprises a plurality of items, which indicate how the compressed weights can be decompressed into decompressed weights.

34. The data processing apparatus according to clause 33, wherein the compression data is applicable to a plurality of matrix multiplication instructions; and at least some of the matrix multiplication instructions indicate different compressed weights from each other.

35. The data processing apparatus according to clause 34, wherein the compression data is applicable to more than two sets of compressed weights.

36. The data processing apparatus according to any one of clauses 34-35, wherein the items are ordered in the compression data according to a beat in which they are used within the plurality of matrix multiplication instructions.

37. The data processing apparatus according to any one of clauses 34-36, wherein the items are ordered in the compression data such that items used in a same beat of a same single matrix instruction operation are adjacent.

38. A data processing method comprising:

receiving a matrix comprising a plurality of weights in a first format;

outputting the matrix comprising the plurality of weights in a second format; and performing a modification of the matrix from the first format to the second format, wherein the second format is computationally contiguous in respect of a data processing apparatus having first vector registers and second vector registers, both configured to be dynamically spatially and dynamically temporally divided, performing a matrix multiplication.

39. A computer program for controlling a host data processing apparatus to provide an instruction execution environment comprising:

input logic configured to receive a matrix in a first format comprising a plurality of values;

output logic configured to output the matrix comprising the plurality of values in a second format; and adjustment logic configured to perform a modification of the model matrix from the first format to the second format, wherein the second format is computationally contiguous in respect of a data processing apparatus having first vector registers and second vector registers, both configured to be dynamically spatially and dynamically temporally divided, performing a matrix multiplication using the matrix.

We claim:

1. A data processing apparatus comprising:

first vector registers and second vector registers, both configured to be dynamically spatially and dynamically temporally divided; and decode circuitry configured to receive one or more matrix multiplication instructions comprising an indication of a set of first elements in the first vector registers and a set of second elements in the second vector registers, and in response to receiving the matrix multiplication instructions to generate a matrix multiplication operation, wherein the matrix multiplication operation is configured to cause one or more execution units to perform a matrix multiplication of the set of first elements by the set of second elements; and an average bit width of the first elements is different from an average bit width of the second elements, wherein:

the matrix multiplication instructions comprise a compressed matrix multiplication instruction that comprises an indication of compression data;

the first elements comprise a single row of n activations, where n is an integer;

the second elements comprise m groups of n compressed weights, where m is an integer greater than 1;

the compression data indicates how the n compressed weights are decompressed to form mn uncompressed weights.

2. The data processing apparatus according to claim 1, wherein the matrix multiplication instructions comprise an indication of a further result register;

the result register is configured to store the first set of bits of the result of the matrix multiplication; and the further result register is configured to store the second set of bits of the result of the matrix multiplication.

3. The data processing apparatus according to claim 1, wherein the matrix multiplication multiplies fewer rows of the first set of elements than a number of columns of the second set of elements.

4. The data processing apparatus according to claim 1, wherein the matrix multiplication is of one row of the first set of elements and two columns of the second set of elements.

5. The data processing apparatus according to claim 1, wherein the bit width of the second elements is four bits or less.

6. The data processing apparatus according to claim 1, wherein the bit width of the second elements is one bit.

7. The data processing apparatus according to claim 6, wherein the one or more matrix multiplication instructions comprise an indicator value, or the data processing apparatus comprises a selection register configured to store the indicator value; and the indicator value is configured to indicate a subset of the weights that are used in the matrix multiplication during a particular beat of the data processing apparatus.

8. The data processing apparatus according to claim 6, wherein bits of at least one of the indication of the set of first elements in the first vector registers and the set of second elements in the second vector registers are used to indicate a subset of the weights that are used in the matrix multiplication during a particular beat of the data processing apparatus.

9. The data processing apparatus according to claim 1, wherein the second elements are signed.

10. The data processing apparatus according to claim 1, wherein the weights are extended prior to the matrix multiplication.

11. The data processing apparatus according to claim 1, wherein the compression data comprises a plurality of portions, each applicable to one of a plurality of matrix multiplication instructions including the compressed matrix multiplication instruction; and the compressed matrix multiplication instruction comprises a compression data selector configured to select one of the portions of the compression data to be applied to form the n uncompressed weights.

12. The data processing apparatus according to claim 11, wherein the compression data is applicable to a plurality of the matrix multiplication instructions;

at least some of the matrix multiplication instructions indicate different second elements from each other; and the compression data comprises a number of items.

13. The data processing apparatus according to claim 12, wherein the compression data is applicable to more than m groups of n weights.

14. The data processing apparatus according to claim 12, wherein the items are ordered in the compression data according to a beat in which they are used within the plurality of matrix multiplication operations.

15. The data processing apparatus according to claim 12, wherein the items are ordered in the compression data such that items used in a same beat of a same single matrix multiplication operation are adjacent.

16. The data processing apparatus according to claim 11, wherein the compression data selector is least significant bits of another parameter of the compressed matrix multiplication instruction.

17. The data processing apparatus according to claim 11, wherein the compression data selector is least significant bits of an address of the second elements.

18. The data processing apparatus according to claim 17, wherein the compression data selector is combinable with a stub address of the first elements to form an address of the first elements; and the compression data selector is combinable with a stub address of a result register to form an address of result register into which at least a part of the result of the matrix multiplication is stored.

19. The data processing apparatus according to claim 11, comprising:

multiplexer circuitry configured to select from between the activations to match with the uncompressed weights that are non-zero to provide as an input to the matrix multiplication.

20. The data processing apparatus according to claim 19, wherein the multiplexer circuitry is configured to select from between a subset of the activations to match with the uncompressed weights that are non-zero.

21. A data processing apparatus comprising:

first vector registers and second vector registers, both configured to be dynamically spatially and dynamically temporally divided; and decode circuitry configured to receive one or more matrix multiplication instructions comprising an indication of a set of first elements in the first vector registers and a set of second elements in the second vector registers, and in response to receiving the matrix multiplication instructions to generate a matrix multiplication operation, wherein the matrix multiplication operation is configured to cause one or more execution units to perform a matrix multiplication of the set of first elements by the set of second elements; and an average bit width of the first elements is different from an average bit width of the second elements, wherein the matrix multiplication instructions comprise an uncompressed matrix multiplication instruction;

the first elements comprise a single group of n activations, where n is an integer;

the second elements comprise m groups of n weights, where m is an integer greater than 1; and a bit width of the second elements is 1/m times a bit width of the first elements.

22. A non-transitory, computer readable medium containing a computer program for controlling a host data processing apparatus to provide an instruction execution environment comprising:

first data structures and second data structures, both configured to be dynamically spatially and dynamically temporally divided; and decode logic configured to receive one or more matrix multiplication instructions comprising an indication of a set of first elements in the first data structures and a set of second elements in the second data structures, and in response to receiving the matrix multiplication instructions to generate a matrix multiplication operation, wherein the matrix multiplication operation is configured to cause execution logic to perform a matrix multiplication of the set of first elements by the set of second elements; and an average bit width of the first elements is different from an average bit width of the second elements, wherein:

the matrix multiplication instructions comprise a compressed matrix multiplication instruction that comprises an indication of compression data;

the first elements comprise a single row of n activations, where n is an integer;

the second elements comprise m groups of n compressed weights, where m is an integer greater than 1;

the compression data indicates how the n compressed weights are decompressed to form mn uncompressed weights.

* * * * *